US011686482B2

(12) United States Patent
Burton et al.

(10) Patent No.: US 11,686,482 B2
(45) Date of Patent: Jun. 27, 2023

(54) SYSTEMS AND METHODS FOR DRYING ROOFS

(71) Applicant: Legend Brands, Inc., Burlington, WA (US)

(72) Inventors: Brandon Burton, Sedro-Woolley, WA (US); William Bruders, Sedro Woolley, WA (US); Brett Bartholmey, Bellingham, WA (US)

(73) Assignee: Legend Brands, Inc., Burlington, WA (US)

( * ) Notice: Subject to any disclaimer, the term of this patent is extended or adjusted under 35 U.S.C. 154(b) by 0 days.

(21) Appl. No.: 17/000,578

(22) Filed: Aug. 24, 2020

(65) Prior Publication Data

US 2020/0393150 A1     Dec. 17, 2020

Related U.S. Application Data

(63) Continuation of application No. 15/700,003, filed on Sep. 8, 2017, now Pat. No. 10,753,628, which is a
(Continued)

(51) Int. Cl.
*E04B 1/70* (2006.01)
*F24F 7/02* (2006.01)
(Continued)

(52) U.S. Cl.
CPC .............. *F24F 7/025* (2013.01); *E04D 13/00* (2013.01); *E04D 15/00* (2013.01); *E04G 23/0281* (2013.01); *F24F 2013/221* (2013.01)

(58) Field of Classification Search
CPC ........ E04B 1/7092; E04B 1/7069; E04B 1/66; E04D 5/145; E04D 13/17; E04D 5/143;
(Continued)

(56) References Cited

U.S. PATENT DOCUMENTS 460,424 A * 9/1891 Bidwell
855,433 A    5/1907 Freeman
(Continued)

FOREIGN PATENT DOCUMENTS

AU         656114 B3     1/1995
AU         6869694       1/1995
(Continued)

OTHER PUBLICATIONS

"TMF Review: Flash Xtractor by Waterclaw," http://www.youtube.com/watch?v=ts0xmTmBFsY, ; uploaded Jul. 2, 2010, 1 page.
(Continued)

*Primary Examiner* — Brian E Glessner
*Assistant Examiner* — Daniel J Kenny
(74) *Attorney, Agent, or Firm* — Perkins Coie LLP

(57) ABSTRACT

Roof drying processes and associated systems. A representative process includes drawing moisture-laden air from within the internal structure of a roof via a vacuum blower, a extraction insert and an extraction manifold, and removing moisture from the moisture-laden air via a dehumidifier. The dry air can be directed back into the roof through an injection insert and an injection manifold.

22 Claims, 23 Drawing Sheets

Related U.S. Application Data continuation of application No. 15/048,881, filed on Feb. 19, 2016, now Pat. No. 10,060,641.

(60) Provisional application No. 62/254,566, filed on Nov. 12, 2015, provisional application No. 62/120,553, filed on Feb. 25, 2015.

(51) Int. Cl.
  E04D 13/00 (2006.01)
  E04D 15/00 (2006.01)
  F24F 13/22 (2006.01)
  E04G 23/02 (2006.01)

(58) Field of Classification Search
  CPC .......... E04D 13/00; E04D 15/00; F24F 7/025; F24F 2013/221; E04G 23/0281
  See application file for complete search history.

(56) References Cited

U.S. PATENT DOCUMENTS

| | | |
|---|---|---|
| 896,290 A | 8/1908 | Freeman |
| 930,134 A | 8/1909 | Blackall |
| 933,003 A | 8/1909 | Smith |
| 1,016,435 A | 2/1912 | Overholt |
| 1,042,711 A | 10/1912 | Moorhead |
| 1,601,774 A | 10/1926 | Scheffer |
| 1,661,553 A | 3/1928 | Baar |
| 1,703,551 A | 2/1929 | Singer |
| 1,787,916 A | 1/1931 | Polson et al. |
| 1,821,715 A | 9/1931 | Kuchinsky |
| 1,929,345 A | 10/1933 | Brown et al. |
| 1,992,238 A | 2/1935 | Rose |
| 2,081,597 A | 5/1937 | Nowak |
| 2,156,890 A | 5/1939 | Wuringer |
| 2,164,392 A | 7/1939 | Ellis |
| 2,210,030 A | 8/1940 | Ellis |
| 2,219,802 A | 10/1940 | Bjorkman |
| 2,240,005 A | 4/1941 | Moyer |
| 2,276,944 A | 3/1942 | Dow |
| 2,280,751 A | 4/1942 | Davis |
| 2,533,697 A | 12/1950 | Stewart |
| 2,554,238 A | 5/1951 | Burrl |
| 2,624,063 A | 1/1953 | Van Der Heem |
| 2,703,905 A | 3/1955 | Faith-Ell |
| 2,719,596 A | 10/1955 | Kent et al. |
| 2,785,432 A | 3/1957 | Rockwell |
| 2,799,040 A | 7/1957 | Hageal |
| 2,822,061 A | 2/1958 | Pettit et al. |
| 3,029,463 A | 4/1962 | Bishop |
| 3,065,491 A | 11/1962 | Amador |
| 3,072,951 A | 1/1963 | Kelnhofer |
| 3,134,128 A | 5/1964 | Campbell |
| 3,169,843 A | 2/1965 | Campbell |
| 3,286,368 A | 11/1966 | Thomas |
| 3,324,846 A | 6/1967 | Smith |
| 3,345,672 A | 10/1967 | La Mers et al. |
| 3,375,540 A | 4/1968 | Hyde |
| 3,506,747 A | 4/1970 | Creskoff |
| 3,571,841 A | 3/1971 | Crouser |
| 3,594,849 A | 7/1971 | Coshow |
| 3,605,171 A | 9/1971 | Candor et al. |
| 3,619,848 A | 11/1971 | Salzmann |
| 3,624,668 A | 11/1971 | Krause |
| 3,689,956 A | 9/1972 | Melreit |
| 3,697,771 A | 10/1972 | Colt |
| 3,701,343 A | 10/1972 | Bowers |
| 3,708,824 A | 1/1973 | Holubinka |
| 3,739,422 A | 6/1973 | Johnson et al. |
| 3,739,483 A | 6/1973 | Meier-Windhorst |
| 3,761,997 A | 10/1973 | Frazier |
| 3,771,193 A | 11/1973 | Hageal |
| 3,774,261 A | 11/1973 | Colt |
| 3,780,398 A | 12/1973 | Candor |
| 3,786,531 A | 1/1974 | Borg |
| 3,800,359 A | 4/1974 | Howard et al. |
| 3,895,407 A | 7/1975 | Parise |
| 3,919,729 A | 11/1975 | Cannan |
| 3,950,815 A | 4/1976 | Fukuchi et al. |
| 3,958,298 A | 5/1976 | Cannan |
| 3,964,925 A | 6/1976 | Burgoon |
| 4,000,538 A | 1/1977 | Tissier |
| 4,013,039 A | 3/1977 | Kubilius et al. |
| 4,074,387 A | 2/1978 | Arato et al. |
| 4,095,309 A | 6/1978 | Sundheim |
| D248,763 S | 8/1978 | Muller |
| 4,109,340 A | 8/1978 | Bates |
| 4,133,072 A | 1/1979 | Face, Jr. |
| 4,153,968 A | 5/1979 | Perkins |
| 4,161,802 A | 7/1979 | Knight et al. |
| 4,182,001 A | 1/1980 | Krause |
| 4,203,714 A | 5/1980 | Wenander |
| 4,207,649 A | 6/1980 | Bates |
| 4,227,316 A | 10/1980 | Schneider |
| 4,264,999 A | 5/1981 | Monson |
| 4,270,238 A | 6/1981 | Shallenberg et al. |
| 4,275,478 A | 6/1981 | Kohlenberger |
| 4,279,057 A | 7/1981 | Restivo |
| 4,284,127 A | 8/1981 | Collier et al. |
| 4,308,636 A | 1/1982 | Davis |
| 4,334,336 A | 6/1982 | Harbeck et al. |
| 4,335,486 A | 6/1982 | Kochte |
| 4,336,627 A | 6/1982 | Bascus |
| 4,339,840 A | 7/1982 | Monson |
| 4,373,226 A | 2/1983 | Lubnitz |
| 4,391,017 A | 7/1983 | Bruensicke |
| 4,391,619 A | 7/1983 | Shono et al. |
| 4,413,372 A | 11/1983 | Berfield |
| 4,416,260 A | 11/1983 | Proctor |
| 4,441,229 A | 4/1984 | Monson |
| 4,443,909 A | 4/1984 | Cameron |
| 4,475,264 A | 10/1984 | Schulz |
| 4,475,265 A | 10/1984 | Berfield |
| 4,488,329 A | 12/1984 | Lackenbach |
| 4,531,928 A | 7/1985 | Ikenoya |
| 4,534,119 A | 8/1985 | Glickman |
| 4,542,556 A | 9/1985 | Hepple |
| 4,571,849 A | 2/1986 | Gardner et al. |
| 4,580,309 A | 4/1986 | Ogden |
| 4,584,736 A | 4/1986 | Gremminger |
| 4,675,935 A | 6/1987 | Kasper et al. |
| 4,677,705 A | 7/1987 | Schuster |
| 4,692,959 A | 9/1987 | Monson |
| D295,092 S | 4/1988 | Mizuno et al. |
| 4,757,654 A * | 7/1988 | Korhonen ............... E04D 13/17 137/197 |
| 4,759,155 A | 7/1988 | Shaw |
| 4,787,188 A * | 11/1988 | Murphy ................. E04D 5/145 52/410 |
| 4,833,853 A * | 5/1989 | Deibele ............... E04D 13/1415 52/410 |
| 4,862,551 A | 9/1989 | Martinez et al. |
| 4,875,249 A | 10/1989 | Collier |
| 4,879,784 A | 11/1989 | Shero |
| D306,788 S | 3/1990 | McAllister et al. |
| 4,922,572 A | 5/1990 | Kohl et al. |
| 4,934,017 A | 6/1990 | Kent |
| 4,968,166 A | 11/1990 | Ingram |
| 4,989,294 A | 2/1991 | Fischer |
| 4,991,254 A | 2/1991 | Roden et al. |
| 5,014,389 A | 5/1991 | Ogilvie et al. |
| 5,032,184 A | 7/1991 | Ogilvie et al. |
| 5,067,199 A | 11/1991 | Alazet |
| 5,103,527 A | 4/1992 | Holland |
| 5,134,748 A | 8/1992 | Lynn |
| 5,152,026 A | 10/1992 | Scarpine |
| 5,155,924 A | 10/1992 | Smith |
| 5,176,316 A | 1/1993 | Whitmen |
| 5,280,666 A | 1/1994 | Wood et al. |
| D345,234 S | 3/1994 | Iorli |
| 5,392,490 A | 2/1995 | Monson |
| 5,392,576 A | 2/1995 | Yeamans |

(56) References Cited

U.S. PATENT DOCUMENTS

| | | | |
|---|---|---|---|
| 5,419,666 A * | 5/1995 | Best | E04D 3/38 |
| | | | 411/542 |
| D361,178 S | 8/1995 | Piret | |
| 5,437,651 A | 8/1995 | Todd et al. | |
| 5,447,005 A | 9/1995 | Giannuzzi | |
| 5,463,791 A | 11/1995 | Roden | |
| 5,472,241 A * | 12/1995 | Kosik, Jr. | E04D 13/1475 |
| | | | 283/42 |
| 5,475,958 A | 12/1995 | Josefsson | |
| 5,485,651 A | 1/1996 | Payeur | |
| 5,485,652 A | 1/1996 | Holland | |
| 5,548,905 A | 8/1996 | Kuma et al. | |
| 5,555,595 A | 9/1996 | Ligman | |
| 5,593,091 A | 1/1997 | Harris | |
| 5,634,238 A | 6/1997 | McCaffrey et al. | |
| D381,144 S | 7/1997 | Moine et al. | |
| 5,655,255 A | 8/1997 | Kelly | |
| 5,655,258 A | 8/1997 | Heintz | |
| 5,659,923 A | 8/1997 | Coombs | |
| 5,720,078 A | 2/1998 | Heintz | |
| 5,778,646 A | 7/1998 | Pfisterer | |
| 5,797,161 A | 8/1998 | Campbell | |
| 5,800,891 A * | 9/1998 | Wasitis | B32B 3/08 |
| | | | 428/42.2 |
| 5,819,366 A | 10/1998 | Edin | |
| 5,870,797 A | 2/1999 | Anderson | |
| 5,891,198 A | 4/1999 | Pearlstein | |
| 5,893,216 A | 4/1999 | Smith | |
| 5,911,260 A | 6/1999 | Suzuki | |
| 5,927,557 A | 7/1999 | Busick et al. | |
| 5,960,556 A | 10/1999 | Jansen | |
| 5,992,051 A | 11/1999 | Salehibakhsh | |
| 6,029,310 A | 2/2000 | Besel | |
| 6,047,437 A | 4/2000 | Suzuki | |
| 6,052,861 A | 4/2000 | Keller | |
| D424,766 S | 5/2000 | Martin | |
| 6,076,597 A | 6/2000 | Manning et al. | |
| 6,080,243 A | 6/2000 | Insley et al. | |
| 6,101,667 A | 8/2000 | Ishikawa | |
| 6,136,098 A | 10/2000 | Tribastone | |
| 6,152,151 A | 11/2000 | Bolden et al. | |
| 6,182,328 B1 | 2/2001 | Roden | |
| 6,195,907 B1 | 3/2001 | Bodnar et al. | |
| 6,243,914 B1 | 6/2001 | Studebaker | |
| 6,266,892 B1 | 7/2001 | Haynie | |
| 6,290,097 B1 | 9/2001 | Oakley | |
| 6,298,577 B1 | 10/2001 | Haynie | |
| 6,355,112 B1 | 3/2002 | Bartholmey et al. | |
| 6,381,803 B1 | 5/2002 | Berfield et al. | |
| 6,421,875 B1 | 7/2002 | Coombs et al. | |
| D468,499 S | 1/2003 | Kitts | |
| 6,513,192 B1 | 2/2003 | Pearlstein | |
| D479,636 S | 9/2003 | Kitts | |
| 6,647,639 B1 | 11/2003 | Storrer | |
| 6,675,437 B1 | 1/2004 | York | |
| 6,789,978 B1 * | 9/2004 | Yoshinari | A01G 9/1407 |
| | | | 403/381 |
| 6,981,338 B2 | 1/2006 | Jensen et al. | |
| D518,259 S | 3/2006 | Wertz | |
| D520,202 S | 5/2006 | Dyson et al. | |
| D522,197 S | 5/2006 | Dyson et al. | |
| 7,059,013 B2 | 6/2006 | Wydra et al. | |
| 7,070,662 B2 | 7/2006 | Studebaker | |
| 7,159,271 B2 | 1/2007 | Sepke et al. | |
| D538,986 S | 3/2007 | Ingram | |
| D565,262 S | 3/2008 | Dyson et al. | |
| 7,392,566 B2 | 7/2008 | Gordon et al. | |
| 7,469,727 B2 | 12/2008 | Marshall | |
| 7,797,906 B2 * | 9/2010 | Kassem | E04D 5/147 |
| | | | 52/713 |
| 7,841,042 B2 | 11/2010 | Roden et al. | |
| 7,870,639 B2 | 1/2011 | Thomas | |
| D635,315 S | 3/2011 | Wertz | |
| D643,169 S | 8/2011 | Calvert | |
| 8,032,979 B2 | 10/2011 | Boone | |
| 8,056,252 B2 | 11/2011 | Fernandes | |
| D663,909 S | 7/2012 | Andreesen | |
| 8,468,716 B1 | 1/2013 | Walker | |
| D701,661 S | 3/2014 | Bruders et al. | |
| 8,784,529 B2 | 7/2014 | Black et al. | |
| 9,068,339 B2 * | 6/2015 | Schaefer | F16M 13/02 |
| 9,516,791 B2 | 12/2016 | Chester | |
| 9,643,035 B2 * | 5/2017 | Mastenbroek | A62B 35/0056 |
| 10,060,641 B2 | 8/2018 | Burton | |
| 10,753,628 B2 | 8/2020 | Burton | |
| 2002/0042965 A1 | 4/2002 | Salem et al. | |
| 2002/0148066 A1 | 10/2002 | Bullis | |
| 2002/0184729 A1 | 12/2002 | Farina | |
| 2003/0041407 A1 | 3/2003 | Savage | |
| 2004/0255484 A1 | 12/2004 | Storrer et al. | |
| 2005/0257394 A1 | 11/2005 | Claesson | |
| 2006/0196074 A1 | 9/2006 | Vilhunen | |
| 2006/0207053 A1 | 9/2006 | Beynon | |
| 2006/0282975 A1 | 12/2006 | Basham et al. | |
| 2007/0039724 A1 | 2/2007 | Trumbower et al. | |
| 2007/0061996 A1 | 3/2007 | Boone | |
| 2007/0079472 A1 | 4/2007 | Carter et al. | |
| 2008/0184520 A1 | 8/2008 | Wolfe et al. | |
| 2008/0263812 A1 | 10/2008 | Williams et al. | |
| 2009/0013596 A1 | 1/2009 | Wang | |
| 2009/0038105 A1 | 2/2009 | Mayer | |
| 2009/0094784 A1 | 4/2009 | Pedlar et al. | |
| 2009/0288685 A1 | 11/2009 | Wolfe et al. | |
| 2010/0024244 A1 | 2/2010 | Potter | |
| 2010/0206344 A1 | 8/2010 | Studebaker | |
| 2010/0223750 A1 | 9/2010 | Kappos et al. | |
| 2010/0269932 A1 | 10/2010 | Richmond | |
| 2011/0064605 A1 | 3/2011 | Hedman | |
| 2012/0233958 A1 * | 9/2012 | Stearns | H01Q 1/1221 |
| | | | 52/708 |
| 2016/0244962 A1 | 8/2016 | Burton et al. | |

FOREIGN PATENT DOCUMENTS

| | | | |
|---|---|---|---|
| AU | 1471595 A | 7/1995 | |
| AU | 664947 B2 | 12/1995 | |
| AU | 736546 B2 | 8/2001 | |
| AU | 199923942 B2 | 8/2001 | |
| CA | 02559485 A1 | 9/2005 | |
| CA | 02568203 A1 | 12/2005 | |
| GB | 2145620 A | 4/1985 | |
| WO | WO-0106188 A1 | 1/2001 | |
| WO | WO-2005118959 A1 | 12/2005 | |

OTHER PUBLICATIONS

"Water Claw debuts the FLASHXtractor," i Cleaning Specialist, http://www.icsmag.com/articles/print/water-claw-debuts-the-flashxtractor, Mar. 8, 2010, 1 page.

Dri-Eaz, "Rescue Mat System," <http://www.dri-eaz.com/VTC/RescueMat.html>, internet accessed on Jun. 20, 2005, 7 pages.

Injectidry Systems, Inc., "Product Page," <http://web.archive.org/web/20000520132110/www.injectidry.com/product.htm>, internet accessed on May 20, 2005, 3 pages.

Injectidry Systems, Inc., "Vac-It Panels," <http://web.archive.org/web/20021222211319/www.injectidry.com/vpanel.htm>, internet accessed on Jun. 20, 2005, 2 pages.

JonDon, "DryPro Water Vac", <http://www.jondon.com>, internet accessed on Apr. 2, 2010, 2 pages.

U.S. Products, "The Flood King—Portable Water Extractor for Restoration," Instant 212° F. Heat at the Wand Tip, http://www.usproducts.com/products/restoration/floodking.htm, accessed Aug. 17, 2011, 1 page.

* cited by examiner

SYSTEMS AND METHODS FOR DRYING ROOFS

CROSS-REFERENCE TO RELATED APPLICATIONS

The present application Ser. No. 15/700,003, now issued as U.S. Pat. No. 10,753,628, filed Sep. 8, 2017, which is a continuation of U.S. patent application Ser. No. 15/048,881, now issued as U.S. Pat. No. 10,060,641, filed Feb. 19, 2016 which claims priority to the following provisional applications, both of which are incorporated herein by reference: U.S. Provisional Application 62/120,553 filed on Feb. 25, 2015, and U.S. Provisional Application 62/254,566 filed on Nov. 12, 2015.

TECHNICAL FIELD

The present technology is directed generally to roof drying processes and associated systems.

BACKGROUND

The roof of a building provides coverage, shielding, shading, and structural support. Some types of roofs can have multiple layers that provide different functions. For example, a representative roof can have a corrugated steel layer that provides structural support, an insulation layer that prevents or reduces heat transfer through the roof, a fiber board layer that provides a surface suitable for membrane bonding, and a membrane layer that can prevent moisture penetration and reflect incoming sunlight. However, if the membrane layer is broken or penetrated, moisture can permeate the roof. This unwanted moisture inside the roof can compromise the functions provided by the remaining roof layers. The unwanted moisture can also cause serious structural damage to the roof and therefore raise safety concerns. Accordingly, there is a need for improved systems and techniques for effectively drying roofs.

DETAILED DESCRIPTION

Figure 1A:
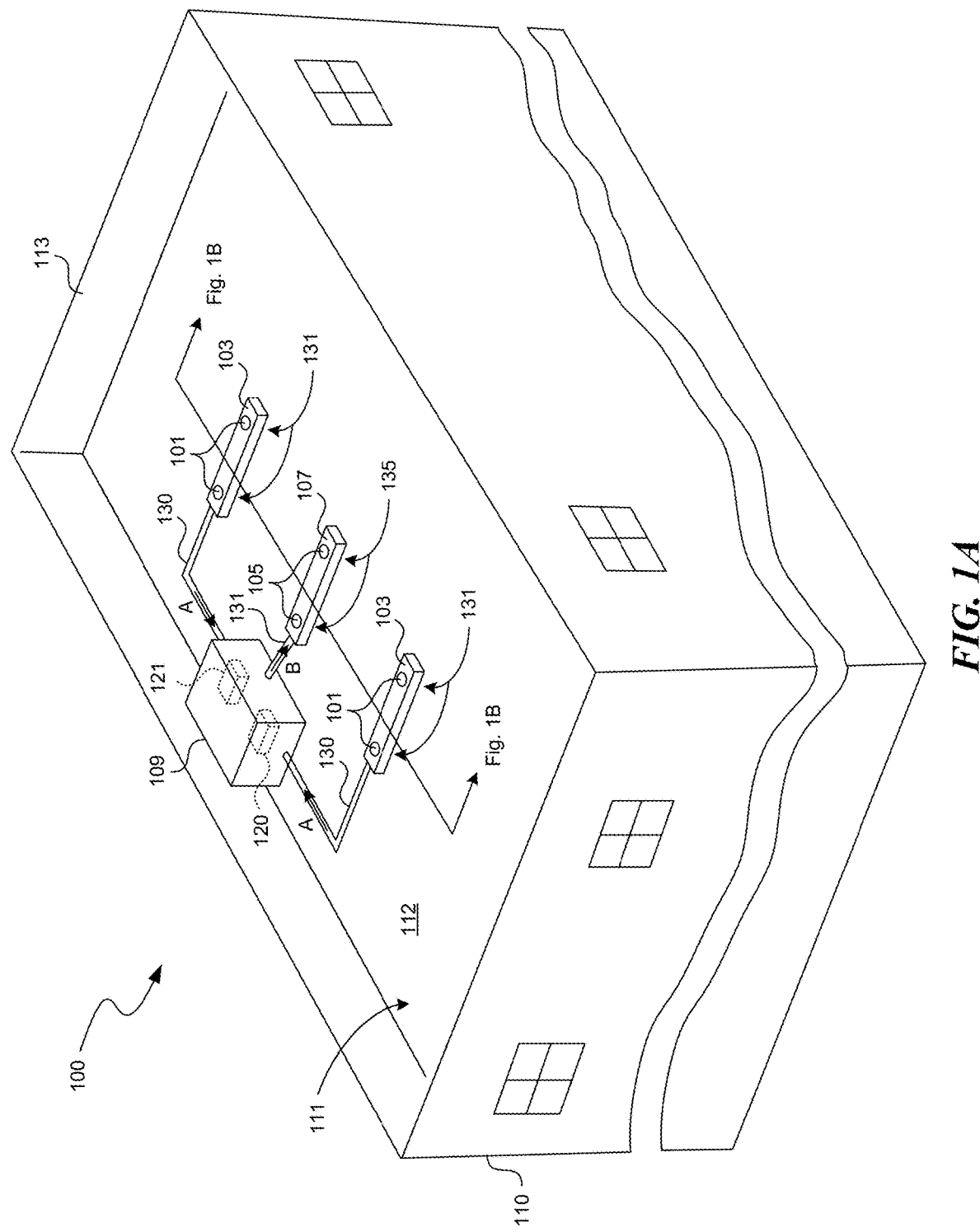
FIG. 1A is a partially schematic, isometric illustration of a structure with a roof on which a system in accordance with the present technology is installed and operated.

The present technology is directed generally to apparatuses, systems, devices, and methods for drying building roofs. Methods in accordance with particular embodiments of the disclosed technology can be used to effectively dry building roofs that are water-damaged for any of a variety of reasons, such as severe weather conditions, age, improper installation, structural defects, and/or improper cleaning processes.

In general terms, the systems and methods disclosed herein are directed to withdrawing moisture from the internal structure of a roof. In several representative embodiments, this is done by inserting extraction inserts at one or more extraction locations, and inserting injection inserts at one or more injection locations of the roof structure, so as to be in fluid communication with the moist areas of the structure. Dry air can be injected into the injection inserts and travels through the internal roof structure to the extraction inserts. Along the way, the dry air picks up moisture from the wet roof structure. The moist air is removed from the roof structure at the extraction locations. The air is then dried (e.g., via a dehumidifier) and returned to the injection locations.

The foregoing arrangement is generally referred to as a "recirculating" arrangement. In other embodiments, the air is not recirculated. For example, if the ambient air is dry enough, it can be propelled or drawn directly into the injection inserts from the environment, and the moist air removed from the extraction inserts can be expelled directly into the environment, without being dried and recirculated. The air used for this process can be (a) drawn out of the extraction inserts via vacuum, or (b) forced into the injection inserts via pressure, or (c) both (a) and (b). In another non-recirculation arrangement, the injected air can be dried prior to being injected (e.g., if the ambient air is moist), but is not recovered and recirculated after being removed from the roof. Embodiments for which the air is not recirculated are referred to herein as "single pass" arrangements.

Several details describing structures and processes that are well-known and often associated with these types of systems and processes, but that may unnecessarily obscure some significant aspects of the presently disclosed technology, are not set forth in the following description for purposes of clarity. Furthermore, although the following disclosure sets forth several embodiments of different aspects of the disclosed technology, several other embodiments can have different configurations and/or different components than those described in this section. Accordingly, the disclosed technology may include other embodiments with additional elements not described below with reference to FIGS. 1A-15 and/or without several of the elements described below with reference to FIGS. 1A-15.

Several embodiments of the technology described below may take the form of computer-executable instructions, including routines executed by a programmable computer and/or controller. For example, embodiments relating to methods of drying a roof or methods of balancing multiple airflows for drying a roof. Persons having ordinary skills in the relevant art will appreciate that the technology can be practiced on computer and/or controller systems other than those described below. The disclosed technology can be embodied in a special-purpose computer, controller or data processor that is specifically programmed, configured or constructed to perform one or more of the computer-executable instructions. Accordingly, the terms "computer" and "controller" as generally used herein refer to any suitable data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium.

The technology can also be practiced in distributed environments, where tasks or modules are performed by remote processing devices that are linked through a communications network. For example, a controller in a system in accordance with the present disclosure can be linked with and control other components in the system. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks.

Several embodiments are described below in the context of injection inserts, which are inserted into the roof at one or more injection locations, and extraction inserts, which are inserted into the roof at one or more extraction locations. In other embodiments, the process of extracting moisture from the roof can be conducted (a) without extraction inserts, or (b) without injection inserts, or (c) without extraction inserts and without injection inserts. Instead, the operator can either drill holes or use pre-existing holes at the injection locations and/or the extraction locations. An advantage of the inserts is that they provide additional control (when compared to drilled holes) over the manner in which fluid flows enter and exit the roof structure during the drying process.

FIG. 1A is a partially schematic, isometric illustration of a structure 110 having a roof 111 on which a system 100 in accordance with an embodiment of the present technology is installed and operated. As shown in FIG. 1A, the roof 111 can have an upwardly-facing roof surface 112 surrounded by a parapet 113. The system 100 is configured to be installed and operated on the roof surface 112. In the illustrated embodiment shown in FIG. 1A, the system 100 can include multiple (e.g., four) extraction locations 131, each with a corresponding extraction insert 101. The system 100 can also include multiple (e.g., two) extraction manifolds 103 connected to (and in fluid communication with) the extraction inserts 101 at the extraction locations 131. The system can further include multiple (e.g., two) injection locations 135, each with a corresponding injection insert 105, a corresponding injection manifold 107 connected to (and in fluid communication with) the injection inserts 105 at the injection locations 135, and a moisture-removal device or dryer 109 (e.g., a dehumidifier). In other embodiments, the numbers and/or positions of the extraction inserts 101, extraction manifolds 103, injection inserts 105, and injection manifolds 107 can vary depending on one or more factors, including the spatial distribution of the moisture to be removed, the access to various portions of the roof 111, the structural integrity of the roof 111, the slope of the roof 111, and/or other suitable factors.

As shown in FIG. 1A, the extraction manifolds 103 can be positioned parallel to the injection manifold 107. In other embodiments, the extraction manifolds 103 and the injection manifold 107 can be positioned differently (e.g., not parallel to each other). In some embodiments, the system 100 can be operated without the extraction manifolds 103 and the injection manifold 107. Instead, the extraction inserts 101 and the injection inserts 105 can be connected directly to the moisture-removal device 109. In some embodiments, the extraction inserts 101 and the injection inserts 105 can be arranged in a staggered grid. Accordingly, each extraction insert 101 can be surrounded by multiple (e.g., four) injection inserts 105, and each injection insert 105 can be surrounded by multiple (e.g., four) extraction inserts 101.

The moisture-removal device 109 is configured to remove moisture from within the internal structure of the roof 111 (e.g., the internal layers of the roof 111). Accordingly, the moisture-removal device 109 can include a moisture-removal component 120, e.g., a water separator, a dehumidifier, or another suitable device. The moisture-removal device 109 can be in fluid communication with the moist internal structure of the roof 111 via removal conduits 130 (e.g., hoses or pipes), which are in turn connected to the extraction manifolds 103 and/or the extraction inserts 101 to receive and deliver moist air, as indicated by arrows A. The moisture-removal device 109 can also include an air mover 121, e.g., a vacuum blower or a fan. The air mover 121 is configured to draw moisture-laden air from within the roof 111 through the extraction inserts 101 and the extraction manifolds 103. The moisture-removal component 120 can remove moisture from the moisture-laden air to produce dry (or drier) air. In the recirculating arrangement shown in FIG. 1, the air mover 121 returns the dry air to the internal structure of the roof 111 through the injection inserts 105 and the injection manifold 107, via supply conduits 131 (e.g., hoses or pipes) as indicated by arrow B. The dry air picks up additional moisture, and the cycle continues.

Figure 1B:
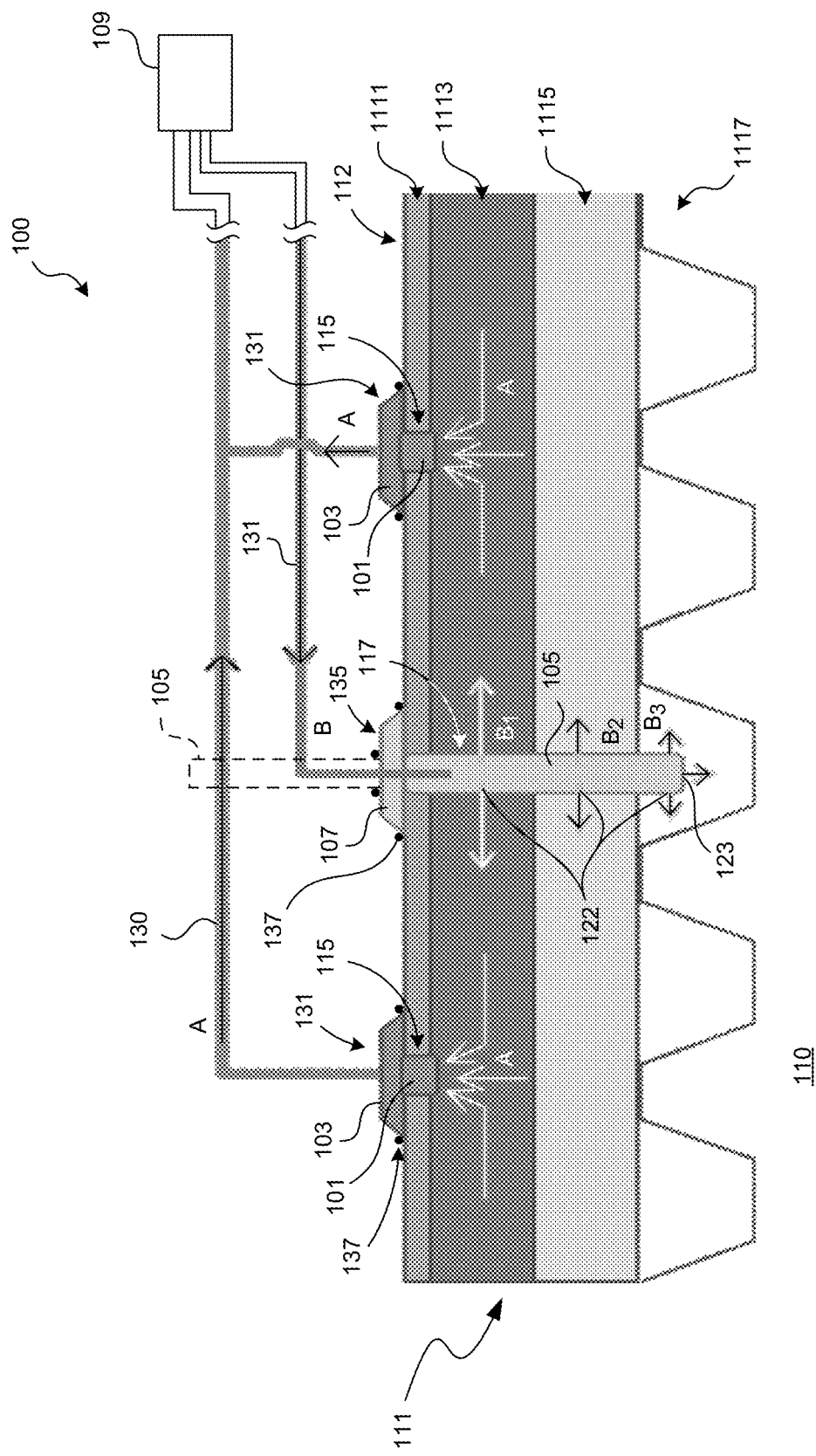
FIG. 1B is a partially schematic cross-sectional illustration of a portion of the system shown in FIG. 1A.

FIG. 1B is a partially schematic cross-sectional view taken generally along line 1B-1B of FIG. 1A, illustrating the roof 111, two extraction inserts 101 and an injection insert 105. As shown in FIG. 1B, the roof 111 can include a membrane layer 1111, a fiber board layer 1113 (also referred to in the industry as a cover board layer), an insulation layer 1115, and a corrugated steel layer 1117. The corrugated steel layer 1117 can provide structural support for the roof 111. The insulation layer 1115 can reduce or prevent heat transfer between the interior and the exterior of the structure 110. The fiber board layer 1113 can cover the insulation layer 1115 and provide a surface suitable for bonding. The membrane layer 1111 can be bonded to the insulation layer 1115 and can prevent or reduce moisture penetration from the outside to the inside of the roof 111. In some embodiments, the membrane layer 1111 can also be reflective to sunshine or other types of radiation to supplement the insulation function provided by the insulation layer 1115.

As shown in FIG. 1B, the extraction inserts 101 can be positioned in first holes 115 of the roof 111, and the injection insert 105 can be positioned in a second hole 117. In some embodiments, the first holes 115 and/or the second hole 117 can be deliberately drilled or otherwise formed to facilitate drying the roof 111, and in other embodiments, the first holes 115 and/or the second hole 117 can be pre-existing holes, recesses, indentions, or other similar features that allow access to the interior layers of the roof 111.

In operation, the moisture-laden air from within the roof 111 can be drawn out via the extraction inserts 101, indicated by arrows A. The moisture-laden air moves through the extraction manifolds 103 toward the moisture-removal device 109. The moisture-removal device 109 can then remove (or partially remove) moisture from the moisture-laden air. The system 100 then returns the dried air to the internal structure of the roof 111, as indicated by arrows B, via the injection manifold 107 and the injection insert 105.

Unwanted moisture can exist in any of the layers of the roof 111. Accordingly, as shown in FIG. 1B, the dry air can be delivered to multiple layers of the roof 111. For example, the injection insert 105 can include multiple holes, perforations, pores or other openings 122, at multiple depths, to inject dry air into the fiber board layer 1113 (as indicated by arrow B1), the insulation layer 1115 (as indicated by arrow B2), and/or the corrugated steel layer 1117 (as indicated by arrow B3).

In a typical case, the unwanted moisture accumulates in the fiber board layer 1113 and/or the insulation layer 1115. In other cases, however, the unwanted moisture can accumulate in the corrugated steel layer 1117. Because the amount of moisture in each layer (and whether or not a given layer has any moisture at all) can vary from one roof to the next, the system 100 can be configurable or adjustable so as to adjust the amount of the dry air injected into the different layers of the roof 111. In some embodiments, for example, the injection insert 105 can be a perforated insert with a perforation pattern that varies along the length or height of the insert. More particularly, in some embodiments, the injection insert 105 can be designed to deliver 50% of the incoming dry air to a first layer (e.g., the fiber board layer 1113), 30% of the incoming dry air to a second layer (e.g., the insulation layer 1115), and 20% of the incoming dry air to a third layer (e.g., the corrugated steel layer 1117). In other embodiments, the foregoing percentages can be different, e.g., depending on the structure of the roof 111 and/or the distribution of moisture within the roof structure.

In a further embodiment, the vertical position of the injection insert 105 is deliberately adjustable to control which roof layer or layers receive dry air. For example, the injection insert 105 can have one or more injection pores 123 positioned only at or toward the bottom of the injection insert 105. When an operator of the system 100 wants to focus on removing moisture or fluid from a particular layer of the roof 111, he/she can position the injection insert 105 so that the injection pore(s) 123 are at that layer. This design enables the operator of the system 100 to conveniently use the same injection insert 105 to address moisture issues at any layer, and/or to change the layer from which moisture is removed, by simply adjusting the position of the injection insert 105. To accommodate the vertical motion of the injection insert 105 (which is indicated in dashed lines in FIG. 1B) without compromising the integrity of the injection manifold 107, the system 100 can include an air-tight component (e.g., a seal ring) between the exterior surface of the injection insert 105 and an opening in the injection manifold 107.

In the illustrated embodiment shown in FIG. 1B, the height of the extraction insert 101 is smaller than the height of the injection insert 105. For example, the extraction insert 101 can be sized to extend just beyond the thickness of the membrane layer 1111. It is expected that this arrangement will produce suitable drying in all the layers below the membrane 1111 because moist air can be withdrawn from all the sub-membrane layers with the extraction insert 101 in this position. In other embodiments, however, the height of the extraction insert 101 can be different. For example, if the moisture is primarily in the insulation layer 1115 and/or the corrugated steel layer 1117, and/or it is difficult to draw moist air through the fiberboard layer 1113, the extraction insert 101 can extend further. For example, the extraction insert 101 can extend into the insulation layer 1115 (e.g., if the moisture is primarily in the insulation layer 1115) or through the insulation layer (e.g., if the moisture is primarily in the corrugated steel layer 1117). In still another embodiment, the extraction insert 101 can have a configuration similar or identical to that of the injection insert 105 so that the vertical position of the extraction insert 101 can be adjusted in the manner described above with reference to the injection insert 105.

The extraction manifold 103 and the injection manifold 107 can be secured in position at or near the extraction location(s) 131 and the injection location(s) 135, respectively. For example, if the membrane layer 1111 is sufficiently smooth, and a vacuum is drawn on the extraction manifold 103 to withdraw moist air, the force of the vacuum can be sufficient to hold the extraction manifold 103 in place. If the membrane surface is rough or uneven, or if the operator wants to further secure the extraction manifold 103 in place, the operator can add a seal 137 (e.g., a silicone seal) between the extraction manifold 103 and the membrane layer 1111. The injection manifold 107 can be made heavy enough that it will stay in place over the injection location(s) 135, despite the elevated pressure within it, and can further include a seal 137 (e.g., if the membrane layer 1111 is rough or uneven) or no seal 137 (e.g., if the membrane layer 1111 is sufficiently smooth).

The same manifold arrangements can be used whether or not individual injection sites 135 include an injection insert 105, and whether or not individual extraction sites 131 include an extraction insert 103. In such instances, the injection manifold 107 is placed directly over the second hole(s) 117 and the extraction manifold 103 is placed directly over the first hole(s) 115.

Figure 2:
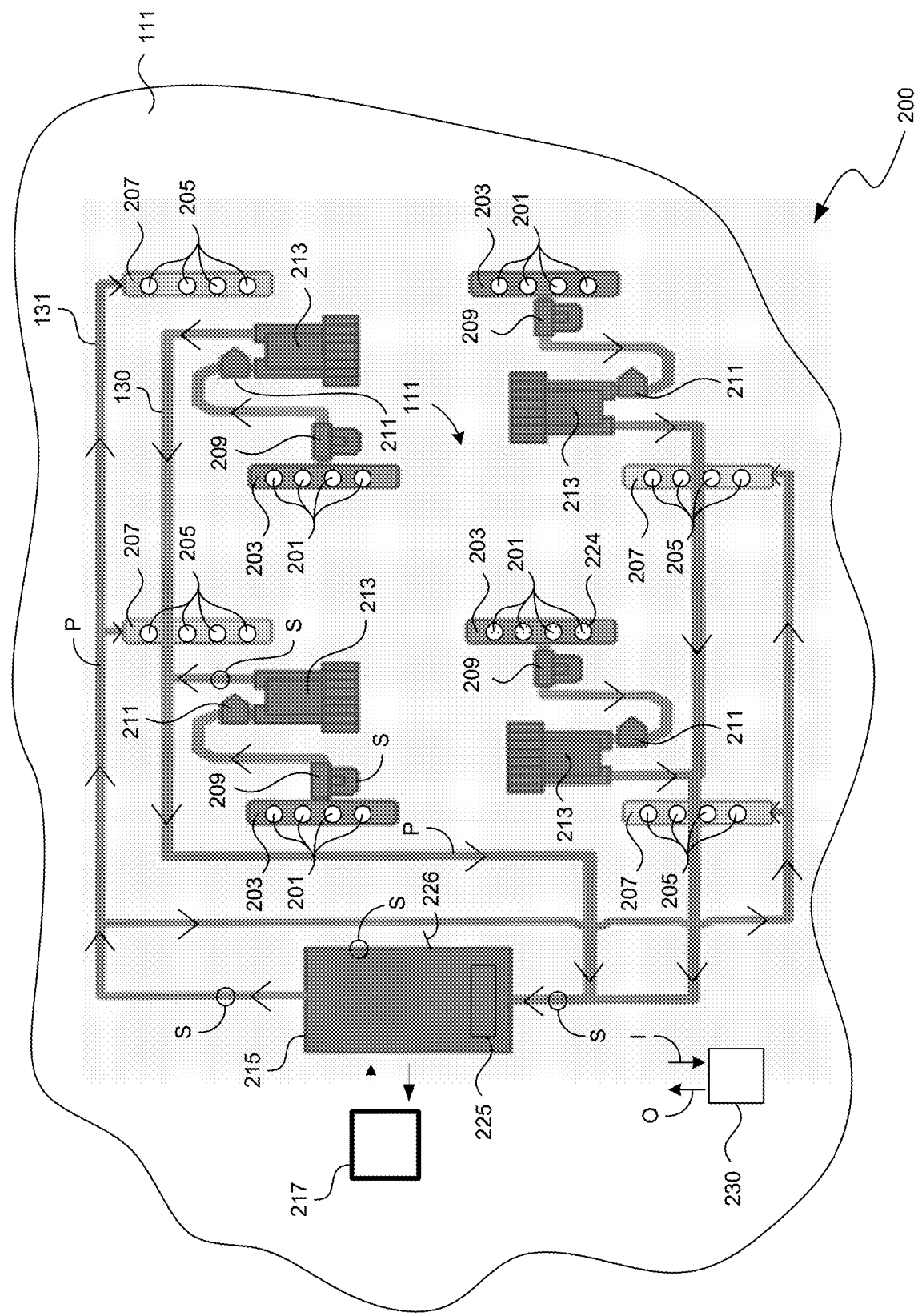
FIG. 2 is a partially schematic illustration of a system configured to dry a roof in accordance with an embodiment of the present technology.

FIG. 2 is a partially schematic illustration of a system 200 configured to dry a roof 111 in accordance with an embodiment of the present technology. As shown in FIG. 2, some or all the components of the system 200 can be positioned on the roof 111. In other embodiments, however, some components of the system 200 can be positioned on one or more floors of the building and/or on the ground outside the building. The system 200 can include one or more extraction inserts 201, one or more extraction manifolds 203, one or more injection inserts 205, and one or more injection manifolds 207. The system 200 can also include one or more water separators 209, vacuum relief valves 211, and air movers (e.g., vacuum blowers 213), all of which are shown schematically in side view for purposes of illustration. The system 200 can further include one or more dehumidifiers 215, and one or more heat exchangers 217.

The extraction inserts 201 are configured to be positioned in the structure of the roof 111 to draw moisture-laden air therefrom, generally in the manner described above. In a representative embodiment, the extraction inserts 201 can have a hollow space to allow the moist air to pass through. In some embodiments, the extraction insert 201 can include a filter component 224 or other partially blocking device that allows air (e.g., moisture-laden air) to pass while preventing constituent materials of the roof (e.g., fibers, plastic, rubble, sand, concrete fillers, etc.) from passing. The extraction inserts 201 can be made of plastic or other suitable materials, and are connected to and in fluid communication with the corresponding extraction manifolds 203.

In the illustrated embodiment shown in FIG. 2, one extraction manifold 203 is connected to (and receives moisture from) four extraction inserts 201. In other embodiments, the number of extraction manifolds 203 and corresponding extraction inserts 201 can vary depending on various factors, such as the number and positions of the injection inserts 205 and the injection manifolds 207, the size and/or shape of the area to be dried, the amount of moisture to be removed, the capacities of the relevant components (e.g., the water separator(s) 209, the vacuum blower(s) 213, and/or the dehumidifier(s) 215) and/or other suitable factors.

As discussed above, the injection inserts 205 are positioned to direct dry air into the roof. Accordingly, the injection inserts 205 can have a hollow space to allow dry air to pass through. The injection inserts 205 can be made of plastic or other suitable materials, and can have a perforated, porous, and/or otherwise flow-through structure. The injection inserts 205 can be connected in fluid communication with the injection manifolds 207, as discussed above.

In the illustrated embodiment shown in FIG. 2, one injection manifold 207 is connected to four injection inserts 205. In other embodiments, the injection manifolds 207 can be connected to other numbers of injection inserts 205, depending on various factors, such as the number and positions of the extraction inserts 201 and/or extraction manifolds 203, the size and/or shape of the area to be dried, the amount of moisture to be removed, the capacities of the relevant components (e.g., the water separator(s) 209, the vacuum blower(s) 213, the dehumidifier(s) 215) and/or other suitable factors.

The size, number and/or location of the extraction inserts 201, extraction manifolds 203, injection inserts 205, and injection manifolds 207 can be selected so that the amount of moisture-laden air drawn from the roof 111 is substantially equal to the amount of the dry air injected into the roof 111. Accordingly, the extraction inserts 201, the extraction manifolds 203, the injection inserts 205, and the injection manifolds 207 can have a variety of suitable sizes, shapes and positions that facilitate the foregoing balanced flow.

The water separator 209 can be located downstream of the extraction inserts 201 to remove at least some solids, debris, fluids, and/or moisture from the moisture-laden air drawn from the roof 111, e.g., before the moisture-laden air is delivered to the vacuum blower 213 and the dehumidifier 215. In some embodiments, the water separator 209 can be a centrifugal water separator. In other embodiments, the water separator 209 can be another suitable devices that can separate water/fluids/solids from the air in which these constituents are entrained. In any of these embodiments, the water separator 209 can remove liquid water to achieve one or both of two purposes: (a) preventing the liquid water from entering the vacuum blower 213, which could otherwise damage or disable the vacuum blower 213, and/or (b) reducing the water extraction demand on the dehumidifier 215, which is generally configured to remove water vapor and is less suited to removing liquid water.

As shown in FIG. 2, individual vacuum blowers 213 are positioned in fluid communication with a corresponding extraction manifold 203 (and the associated extraction inserts 201). In other embodiments, the vacuum blower 213 can be positioned at other locations along the airflow path P between the extraction inserts 201 and the injection inserts 205. A vacuum relief valve 211 can be positioned adjacent to the vacuum blower 213 and can be configured to adjust the air pressure (or the vacuum drawn by the vacuum blower 213) along the airflow path by allowing ambient air into the airflow path or releasing (e.g., bleeding out) a portion of the air in the airflow path to the environment. In several embodiments, the air pressure along the airflow path can be monitored by various sensors S. In such embodiments, the vacuum relief valves 211 can adjust the air pressure in response to the output produced by the sensors S. Accordingly, the vacuum relief valves 211 can be used to balance the airflows around the flow circuit of the recirculating arrangement shown in FIG. 2.

The dehumidifier 215 can be positioned in fluid communication with the extraction manifold 203 (and thus the extraction inserts 201) and downstream of the vacuum blowers 213. In other embodiments, the dehumidifier 215 can have other positions, e.g., upstream of one or more vacuum blowers 213. The dehumidifier 215 is configured to (further) remove moisture from the moisture-laden air drawn from the extraction inserts 201.

In some embodiments, particularly when the ambient air is relatively warm and wet, the system 200 can be configured to maintain the airflow path as a "closed-loop." This arrangement can restrict or prevent the inflow of moist ambient air, which would otherwise burden the moisture-removal capacity of the system 200. The moisture-removal capacity of the system 200 can depend at least in part on the efficiencies of the water separator 209 and/or the dehumidifier 215. The system 200 can maintain a "closed loop" airflow path by keeping the flowrate along the airflow path from the extraction inserts 201 to the injection inserts 207 substantially constant. In some embodiments, the flowrate can be established and/or controlled by the vacuum blower 213 with nominal or negligible flowrate changes (e.g., caused by friction loss or leakage).

In some embodiments, the dehumidifier 215 can include an air mover 225 that can draw additional vacuum (e.g., in addition to the vacuum drawn by the vacuum blowers 213) to facilitate moving air along the airflow path from the extraction inserts 201 to the injection inserts 205. The air mover 225 can have a similar air-moving capacity (e.g., capable of moving substantially the same amount of air per time unit) as the one or more vacuum blowers 213. Accordingly, the system 200 can maintain a closed-loop airflow path by keeping the flowrate along the airflow path from the extraction inserts 201 to the injection inserts 205 substantially constant. In this mode, the system 200 does not need to take in air (e.g., from the environment) or release air (e.g., to the environment) along the airflow path.

In other embodiments, the system 200 can operate in an "open loop," (but still recirculating) arrangement. For example, if the air mover 225 and the vacuum blowers 213 do not have similar air-moving capacities, the system 200 can balance the airflow moved by the vacuum blowers 213 and that moved by the air mover by, for example, bleeding out a particular amount of air in the airflow path (e.g., via the vacuum relief valves 211) or taking in a particular amount of ambient air (e.g., via the vacuum relief valves 211 and/or other inlets along the airflow path).

In some embodiments, when the ambient air is relatively cool and dry, the system 200 can bring ambient air directly into the airflow path so as to enhance an overall efficiency of the system 200. For example, dry ambient air can be drawn in through an air inlet 226 of the dehumidifier 215. In other embodiments, ambient air can be drawn in at any suitable position along the airflow path. For example, ambient air can be drawn directly into the injection inserts 201.

In some embodiments, the dehumidifier 215 can include, or be connected with, a heat exchanger 217. The heat exchanger 217 can be used to precool the airflow into the dehumidifier 215 and heat the airflow exiting the dehumidifier. Representative heat exchangers are described in issued U.S. Pat. No. 8,784,529, filed on Oct. 15, 2012, incorporated herein by reference. The heat exchange process can increase the overall efficiency of the water removal process in a recirculating system.

The system 200 can operate without several of the components shown in FIG. 2. For example, the system 200 can operate without the dehumidifier 215. In such embodiments, the water separator 209 removes moisture of the moisture-laden air to form the dry air to be returned to the roof 111 (via the injection inserts 205). In some embodiments, the system 200 can operate without the water separator 209. In such embodiments, the dehumidifier 215 removes moisture from the moisture-laden air to produce the dry air to be returned to the roof 111. In such instances, the vacuum blowers 213 can be replaced with a different air mover that is not sensitive to the presence of liquid water in the flow drawn from the roof 111. The air mover can be located at any suitable site along the airflow path P.

As indicated above, the system 200 can include multiple sensors S, e.g., coupled to one or more components, such as the water separator(s) 209, the vacuum blower(s) 213, and/or the dehumidifier(s) 215, to monitor those components, and/or positioned along the flow path to monitor the flow between the extraction inserts 201 and the injection inserts 205. In some embodiments, the system 200 can include one or more controllers 230 configured to monitor and control (e.g., optimize) the operation of the system 200, based on inputs from the sensors S. Accordingly, the controller 230 can receive inputs I (e.g., sensed system parameters) and issue directions via outputs O to carry out the functions described above. The controller 230 can communicate with the various components and sensors of the system 200 via wired or wireless connections. For example, the controller 230 can be used to balance the airflow drawn by the vacuum blowers 213 and that drawn by the air mover 225, so as to maintain a constant airflow along the airflow path, as discussed above. The controller can include a set of computer-executable instructions stored in a transitory or non-transitory computer readable medium. The computer-executable instructions can be created or updated at least based on empirical data from operations or measurement results from the various sensors of the system 200.

Figure 3:
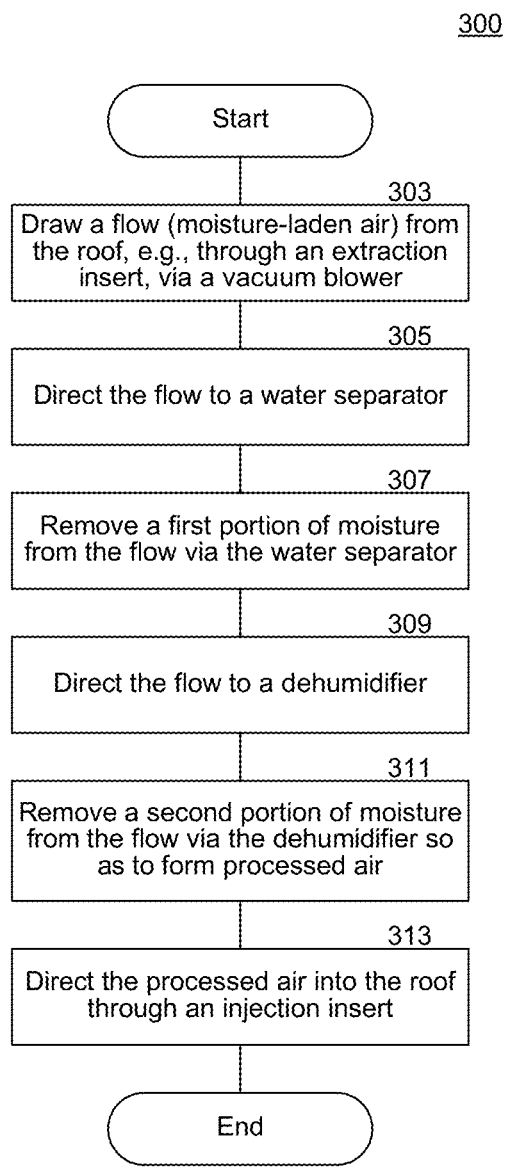
FIG. 3 is a flow diagram illustrating a method for drying a roof in accordance with an embodiment of the present technology.

FIG. 3 is a flow diagram illustrating a method 300 for drying a roof in accordance with several embodiments of the present technology. At block 303, the method includes drawing a flow having moisture-laden air from the roof. This process can be performed by drawing the flow (which may include liquid water in addition to moist air) through an extraction insert (or another suitable structure, or directly via a hole in the roof, with no insert) via a vacuum blower (or other suitable device). At block 305, the process includes directing the water flow to a water separator. At block 307, a first portion of moisture (e.g., liquid water) is removed from the flow by the water separator. At block 309, the flow is directed to a dehumidifier where a second portion of moisture (e.g., vapor) from the moisture-laden air is removed so as to form processed air (e.g., dry air) (block 311). At block 313, the processed air is directed into the roof through an injection insert. In some embodiments, the method 300 can include applying a sealant to seal the first and second inserts and/or the holes in which the inserts are placed when the moisture removal process is complete. In this regard, the inserts can facilitate filling the holes used to inject and/or extract air. For example, if the first (extraction) holes 115 and/or the second (injection) holes 117 extend down to the corrugated steel layer 1117, a liquid sealant placed in the holes would simply run down to the corrugated steel layer 1117 and spread throughout the corrugated channels without plugging the holes. The inserts can slow the flow of sealant sufficiently that it dries and seals the holes.

Figure 4:
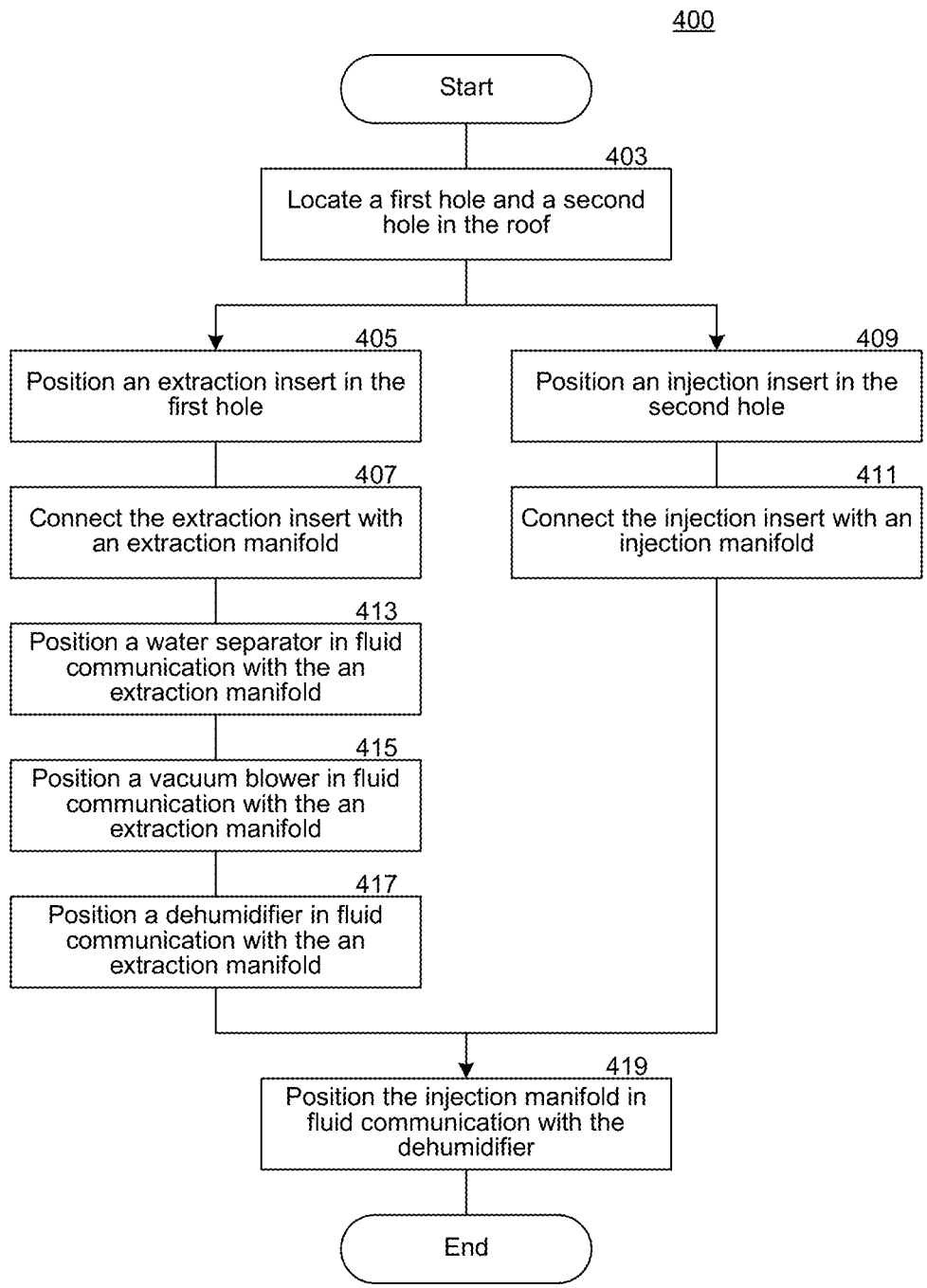
FIG. 4 is a flow diagram illustrating a method for installing a system for drying a roof in accordance with another embodiment of the present technology.

FIG. 4 is a flow diagram illustrating a method 400 for installing a roof drying system in accordance with several embodiments of the present technology. At block 403, the method includes locating a first hole (e.g., an extraction location) and a second hole (e.g., an injection location) in the roof. In some embodiments, the first hole and/or the second hole are deliberately made in the roof as part of the moisture removal operation. In other embodiments, the first hole and/or the second hole can be selected from pre-existing holes of the roof. Factors to be considered when locating the first and second holes include, for example, the distribution of the moisture to be removed, accessibility, structural integrity of the roof, the slope of the roof, etc.

At block 405, the method includes positioning an extraction insert (e.g., the extraction insert 101 or 201 discussed above) in the first hole (e.g., the first hole 115 shown in FIG. 1B). The method 400 can then include connecting the extraction insert with an extraction manifold (e.g., the extraction manifold 103 or 203 discussed above) at block 407. Blocks 409 and 411 can be conducted in parallel or in series with blocks 405 and 407. Block 409 includes positioning an injection insert (e.g., the injection insert 105 or 205 discussed above) in the second hole (e.g., the second hole 117 shown in FIG. 1B). Block 411 includes connecting the injection insert with an injection manifold (e.g., the injection manifold 107 or 207 discussed above). As discussed above, the injection insert and/or the extraction insert can be eliminated in particular embodiments.

At block 413, the method includes positioning a water separator (e.g., the water separator 209 shown in FIG. 2) in fluid communication with the extraction manifold. Block 415 includes positioning a vacuum blower (e.g., the vacuum blowers 213 shown in FIG. 2) in fluid communication with the extraction manifold. At block 417, the method includes positioning a dehumidifier (e.g., the dehumidifier 215 shown in FIG. 2) in fluid communication with the extraction manifold. Block 419 includes positioning the injection manifold in fluid communication with the dehumidifier. In some embodiments, the method 400 can include forming a closed loop drying system that can remove moisture from the roof without adding to or subtracting from air in the airflow path between the extraction inserts and the injection inserts. In other embodiments, the method 400 can include forming an open loop drying system that can bring in ambient air to dry the roof or bleed out surplus air from the airflow path between the extraction inserts and the injection inserts.

In some embodiments, the drying method includes balancing the airflow moved by a first air mover (e.g., the vacuum blower 213) and that moved by a second air mover (e.g., an air mover positioned in or associated with a dehumidifier such as the dehumidifier 215) in a closed loop system. In some embodiments, the method includes balancing the two airflows based on ambient conditions (e.g., temperature and/or humidity) which may be measured by one or more sensors. In some embodiments, the method includes using a controller to balance the two airflows. In some embodiments, the method can be used to balance more than two airflows. For example, the method can include balancing airflows from multiple vacuum blowers, as shown in FIG. 2. Balancing can include varying the speeds and/or otherwise varying the volumetric and/or mass flow rates of the various air moving devices. The present disclosure encompasses both carrying out the foregoing processes and instructing others to carry out one or more of the foregoing processes.

Figure 5:
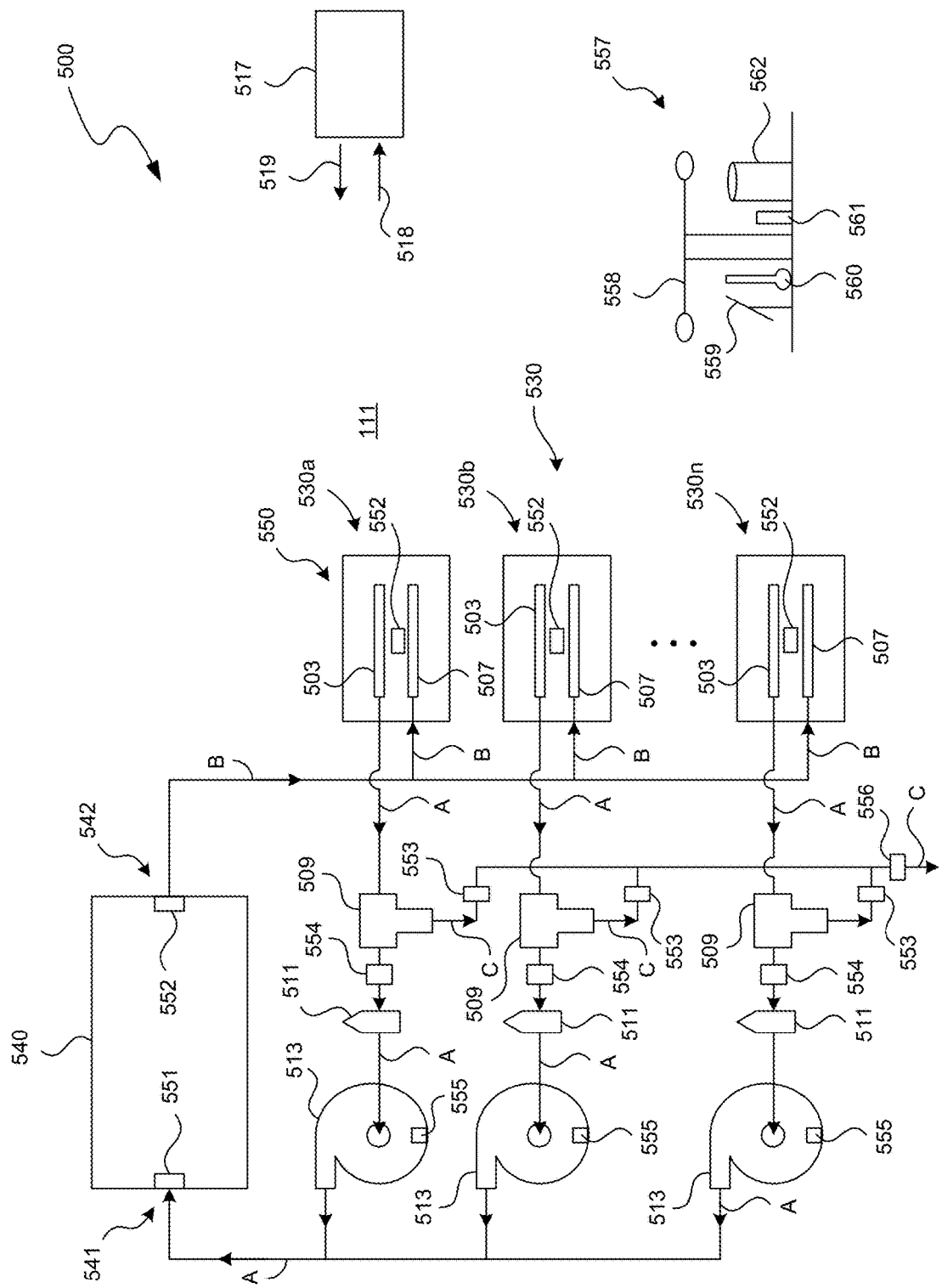
FIG. 5 is a partially schematic illustration of a system that includes a controller and one or more sensors configured to control a roof drying operation in accordance with an embodiment of the present technology.

FIG. 5 is a partially schematic illustration of a system 500 that includes one or more sensors and other features configured to facilitate the process of drying a roof 111 in accordance with several embodiments of the present technology. The system 500 can remove moisture from one or more treatment areas 530 of the roof 111. In FIG. 5, representative treatment areas 530 are illustrated as a first treatment area 530a, a second treatment area 530b and an nth treatment area 530n. In an embodiment illustrated in FIG. 5, each treatment area 530 can include an extraction manifold 503 coupled to a corresponding water separator 509, a vacuum relief valve 511, and a vacuum blower 513. In other embodiments, any of the foregoing components can be shared among multiple treatment areas 530. The vacuum blowers 513 can direct air removed from the treatment areas 530 to a dryer 540 (e.g., a dehumidifier or other moisture removal device) via a dryer inlet 541. Dried air exits the dryer 540 at a dryer outlet 542, and, in an embodiment shown in FIG. 5, the dried air is redirected to the treatment areas 530 via injection manifolds 507. Accordingly, the system shown in FIG. 5 is configured to operate in a recirculating mode.

During operation, an individual vacuum blower 513 draws a flow of moist air, possibly including liquid water, from the treatment areas 530 via the corresponding extraction manifolds 503, as indicated by arrows A. The moist air passes through the water separators 509, where water is separated from the flow, as indicated by arrows C. The water separators 509 can include internal vacuum pumps. Accordingly, in some installations (e.g., smaller installations), the vacuum blowers 513 can be eliminated, and the vacuum function can be performed by the water separators 509. In at least some embodiments, the vacuum relief valve 511 is opened to allow additional (e.g., make-up) air to enter the flow passing into the vacuum blower 513. The vacuum blower 513 directs the flow to the dryer 540, and the resulting dried air is returned to the treatment areas 530 via the injection manifolds 507, as indicated by arrows B.

The system 500 can further include one or more sensors 550 that generate signals indicative of the conditions in the surrounding environment and/or at, or proximate to, selected system components. The signals are provided as inputs 518 to a controller 517, which can process the inputs and direct outputs 519 (e.g., instructions) for controlling one or more of the components shown in FIG. 5.

In a representative embodiment, the sensors 550 can include a dryer inlet sensor 551 positioned in fluid communication with the dryer inlet 541, and a dryer outlet sensor 552 positioned in fluid communication with the dryer output 542. The dryer inlet sensor 551 can detect the inlet flow temperature, relative humidity, and/or other suitable parameters, or correlates of such parameters (e.g., raw data in the form of a voltage or current). The outlet sensor 552 can detect the temperature, relative humidity, and/or other suitable parameters or correlates of such parameters of the outlet flow. The information provided by the dryer inlet and outlet sensors 551, 552 can be used (e.g., by the controller 517) to control the operation of the dryer 540 and/or other system components.

The sensors 550 can also include vacuum sensors 555 that communicate with the corresponding vacuum blowers 513. The communication can be fluid communication (for example, to determine the level of vacuum provided by an individual vacuum blower 513), and/or electrical communication (for example, to identify the amount of current drawn by the vacuum blower 513). The vacuum sensors 555 can measure conditions toward the inlet and/or the exit of the vacuum blower 513. This information can be used (a) to provide automatic notifications (e.g., if the vacuum blower 513 fails to operate as expected), and/or (b) to control the amount of air entering the flow stream upstream of the vacuum blower 513 via the vacuum relief valve 511.

The vacuum relief valve 511 can include a relief valve sensor 554 that measures suitable parameters, including the flow temperature and/or relative humidity of the fluid flow. The relief valve sensor 554 can be located upstream of, downstream of, and/or at the bypass inlet of the vacuum relief inlet 511.

FIG. 5 also illustrates water sensors 553 coupled to the outlets of the water separators 509 to measure the amount of water removed at individual water separators 509. Optionally, the system 500 can also include a collective water sensor 556 that measures the total amount of water removed from multiple water separators 509, in addition to or in lieu of measuring the water removed from individual water separators 509.

The system 500 can also include treatment area sensors 552 positioned at (e.g., within) individual treatment areas 530 to provide data from the treatment areas 530. The treatment areas 530 may be enclosed or partially enclosed, as is described in greater detail below with reference to FIGS. 7A-7D. The treatment sensors 552 can detect suitable parameters, e.g., the vacuum level, the temperature, and/or the moisture content within each treatment area 530. For purposes of illustration, a single treatment area sensor 552 is illustrated for each treatment area 530. In a typical installation, individual treatment areas 530 may have multiple treatment area sensors 552. For example, individual treatment area sensors 552 can each be dedicated to a particular function or functions (e.g., measuring vacuum, temperature, and/or moisture content), and each area can include multiple treatment area sensors 552 distributed throughout the treatment area 530, each of which measures a single parameter or multiple parameters, to account for parameter variations within each treatment area 530. For example, a representative embodiment includes one vacuum sensor for each 1000 ft$^2$ of treatment area. A representative temperature sensor includes a thermistor on a rod that can be inserted into the roof structure (e.g., the insulation) to measure the internal temperature of the structure. Particular embodiments can include 10-12 temperature sensors and/or moisture sensors per 1000 ft² of treatment area.

The sensors 550 can further include environmental sensors 557 positioned (e.g., on the roof 111) and configured to measure general environmental conditions, other than those within an individual treatment area 530, and other than those within the system components described above. Representative environmental sensors 557 can include an irradiation sensor 559 that determines the available energy from incident solar radiation, and/or an anemometer 558 that is used to determine the local wind conditions (e.g., wind speed and/or direction). Such data can be important for determining whether the system 500 is to be left on the roof 111 during certain weather conditions. A rain gage 562 can be used to measure the amount of rain falling on the roof 111, which in turn can be used to evaluate the integrity of the roof 111 and/or the system 500 (e.g., by determining if the water removed from the roof 111 by the water separators 509 increases during or after rainfall). One or more temperature sensors 560 can be used to determine the available energy gain resulting from the local ambient temperature, and can be used to balance the flow of air within the system 500. A humidity sensor 561 (e.g., a relative humidity sensor) can be used to determine air flow parameters and valve settings throughout the system 500. For example, information regarding the ambient temperature and humidity can be used to set the vacuum relief valves 511, and/or establish bypass air at the dryer 540.

Each of the foregoing sensors 550 can be coupled to the controller 517 e.g., via a wired connection or a wireless connection. For example, the sensor data can be directed to a cellular-equipped gateway that provides the data to a server and allows an operator to view the data and monitor the system remotely, and make adjustments to the system 500. In another embodiment, the data from the sensors 550 can be accessed directly at the building site. In either of the foregoing embodiments, the adjustments to the system 500 can be made manually, e.g., to balance and adjust the operation of the system components. In still another embodiment, the entire operation can be conducted autonomously. For example, the data can be autonomously directed to the controller 517, and the controller 517 can autonomously change the settings of individual components, as needed, e.g., via motor controlled valves, and/or other actuators.

For purposes of illustration, the controller 517 is illustrated as a single element. As described above, the controller 517 can include multiple, distributed components, which may each be responsible for a particular task, and which together control the overall operation of the system 500.

Figure 6A:
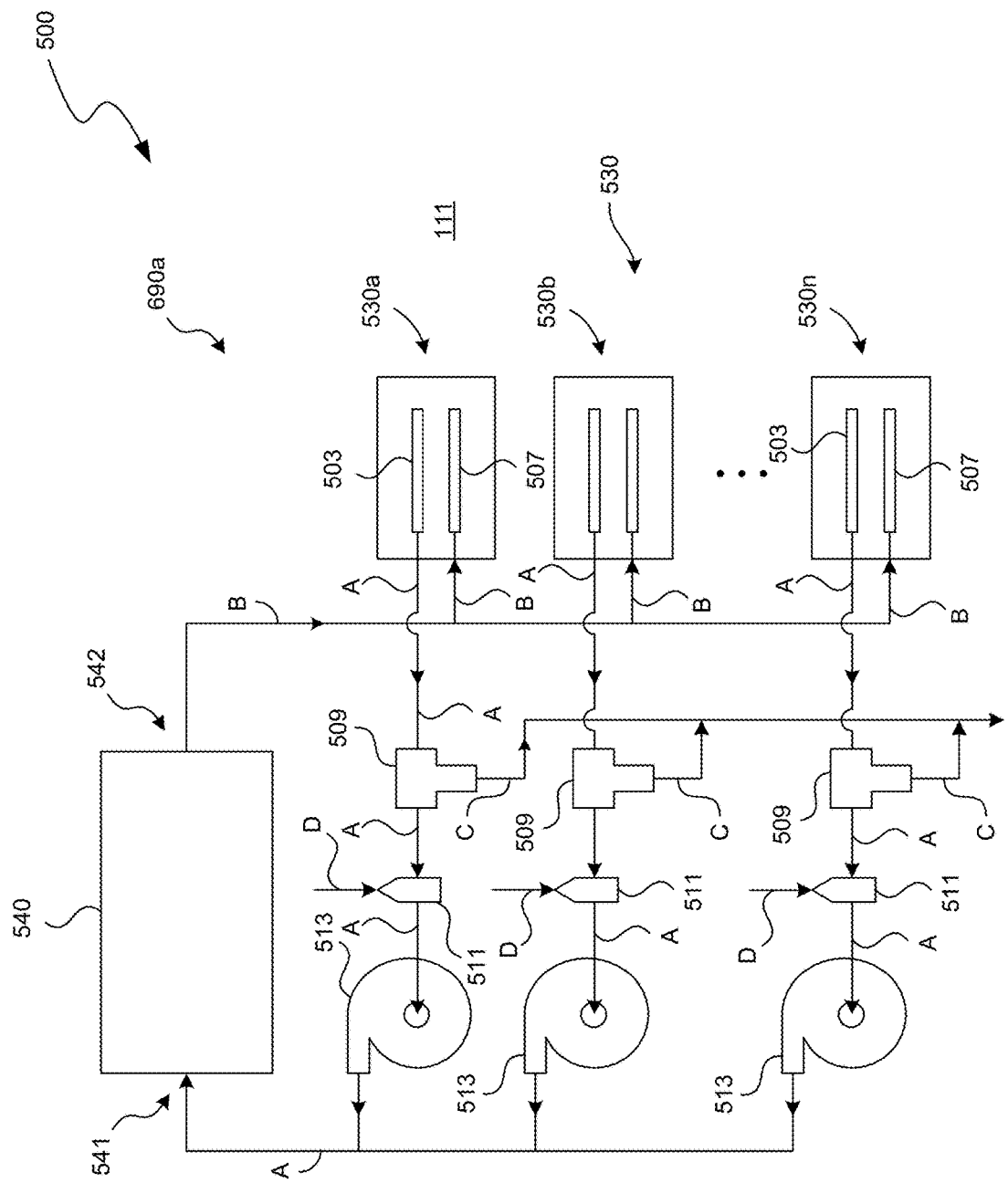
FIGS. 6A-6C are partially schematic illustrations of connections between system components for drying a roof in accordance with several embodiments of the present technology.
Figure 6B:
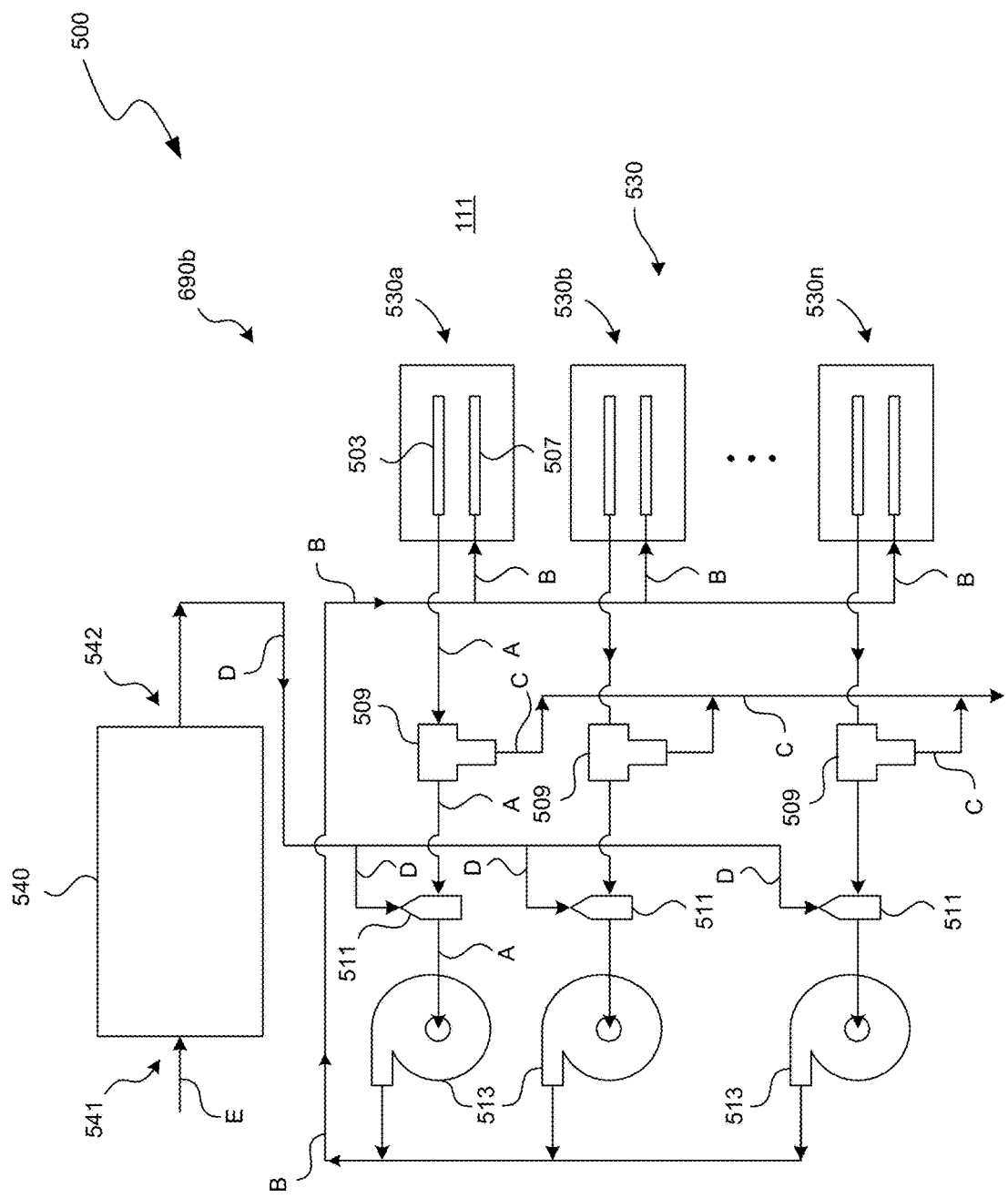
Figure 6C:
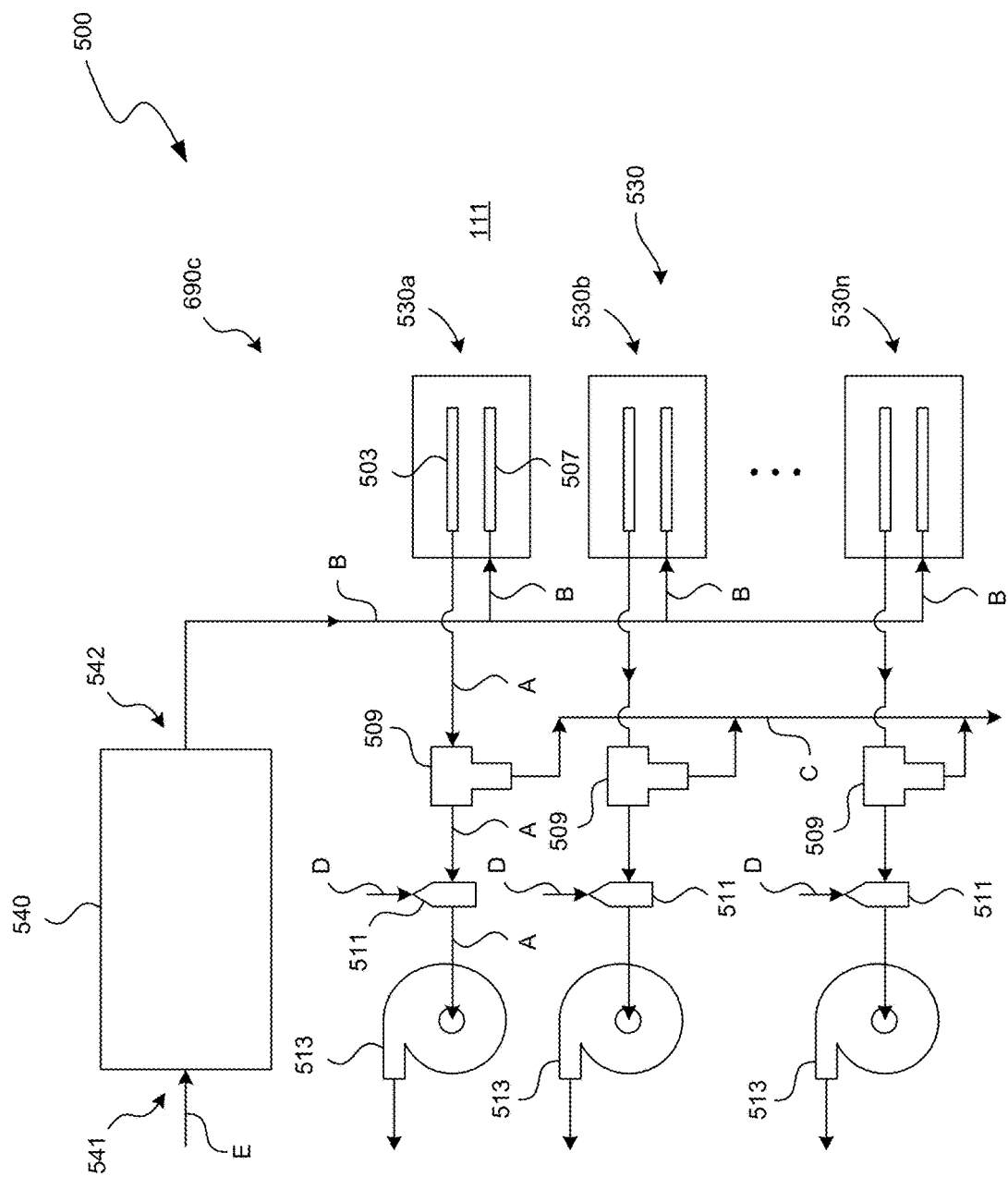

FIGS. 6A-6C illustrate a simplified version of the system 500 described above with reference to FIG. 5, with components interconnected in a variety of manners or configurations, dependent upon factors that can include the local environmental conditions. For purposes of illustration, the sensors 550 described above with reference to FIG. 5 are not shown in FIGS. 6A-6C. However, data from the sensors will typically be used to manually, automatically, or semi-automatically configure the system in any of the arrangements described below with reference to FIGS. 6A-6C.

FIG. 6A illustrates a first configuration 690*a* that can be suitable for temperate or cool climates, for example, those typical of the Pacific Northwest region of the United States. In this embodiment, air is withdrawn from the treatment areas 530 via corresponding extraction manifolds 503, and is directed through the separators 509, relief valves 511, and blowers 513 to the dryer 540, as indicated by arrows A. Water is removed from the flow path by the separators 509 as indicated by arrows C. The vacuum relief valves 511 can be opened to allow air to enter the flow path, as indicated by arrows D. Warm, dry air is returned from the dryer 540 to the treatment areas 530 via the injection manifolds 507, as indicated by arrows B. In this configuration, it can be advantageous to direct the flow evacuated from the treatment areas 530 into the dryer 540 via the blowers 513 because the blowers 513 can add a significant amount of energy to the flow. That additional energy can reduce the likelihood for the dryer 540 to accumulate ice. As a result, the likelihood that the dryer 540 will be unable to shed the accumulated ice can be reduced, and the operational efficiency and endurance of the system 500 can be increased.

FIG. 6B illustrates a second configuration 690*b* of the system 500 that may be suitable for operating in warm, temperate, or varied climates where the ambient air is typically warmer and/or more moist than for the first configuration 690*a* described above with reference to FIG. 6A. The temperature of the ambient air may also vary more than for the first configuration 690*a*. Representative climates include the Pacific Northwest in late summer, and the American Southwest in spring or fall. Because the ambient air is warmer, the air dryer 540 can receive inlet air directly from the environment, as indicated by arrow E. The dried air can be directed into the vacuum relief valves 511, as indicated by arrows D. This approach reduces the likelihood for moist air to enter the flow driven by the blowers 513 (which would be the case if external air were drawn directly into the relief valve 511 without first being dried e.g., in the manner described above with reference to FIG. 6A). Instead, the heat provided by the blowers 513 can vaporize water at the treatment areas 530. As will be described in greater detail below with reference to FIG. 7A, the treatment areas can be further heated by incident solar radiation. As will also be described in greater detail below with reference to FIGS. 7A-7C, a significant amount of the air delivered to the treatment areas 530 escapes from the treatment areas 530 to the surrounding environment. Accordingly, moisture in the flow extracted from the treatment areas 530 can pass through a plenum located above the treatment areas 530, but is generally not re-introduced into the structure of the roof 111.

FIGS. 6A and 6B both illustrate recirculating modes or configurations in which some processed air is returned to the treatment areas 530. FIG. 6C illustrates a third configuration 690*c* in which the system operates in a once-through mode. This configuration can be suitable for operation in high temperature and high humidity climates, for example, the Southeastern region of the United States. In one aspect of this embodiment, the dryer 540 receives high temperature, high humidity air from the environment, (as indicated by arrow E) dries the air, and directs the air back to the treatment areas 530, as indicated by arrows B. The moist flow removed from the treatment areas 530 passes through the water separators 509, the relief valves 511, and the blowers 513, which direct the exhaust flow into the environment in an open loop manner. While this arrangement may be less efficient than recycling the flow exiting the blowers 513, it may be more advantageous to do so than to attempt to remove moisture from the blower outflow under the high temperature, high humidity local conditions. Instead, air dried by the air dryer 540 is directed to the treatment areas 530 (as indicated by arrows B) to reduce or eliminate the likelihood for additional moisture to be reintroduced into the treatment areas 530 while moisture is removed from the treatment areas 530. The third configuration 690c can have particular applicability in situations for which the dew point temperature exceeds the roof temperature. The once-through configuration can avoid condensation that might otherwise form under such conditions.

FIGS. 7A-7D are schematic illustrations of components positioned at the treatment areas 530 described above. In a particular embodiment, the components can include one or more covers 770 that are positioned over an individual treatment area 530 to provide a protected, semi-contained environment in which moist fluid is removed from the underlying roof 111. Components within the protected treatment area 530 and beneath at least one cover are shown in hidden lines in FIG. 7A. In a particular aspect of this embodiment, the cover 770 can have a dark, solar-radiation-absorptive color (e.g., black), and/or can include a one or more materials selected for high radiative absorptivity so as to heat the region of the roof 111 underneath. For example, in a representative embodiment, the cover sheet(s) can include 0.008 inch black plastic sheeting (similar to that used for pond liners), and the treatment area can be an 8 foot by 25 foot rectangle. The sheet(s) forming the cover(s) 770 can be re-usable from one installation to the next. This ability of the cover(s) to contain heat at the treatment areas 530 is expected to more readily vaporize (or at least prevent or restrict condensation of) the moisture in the treatment area, making it easier to remove via the fluid flows described herein.

Figure 7A:
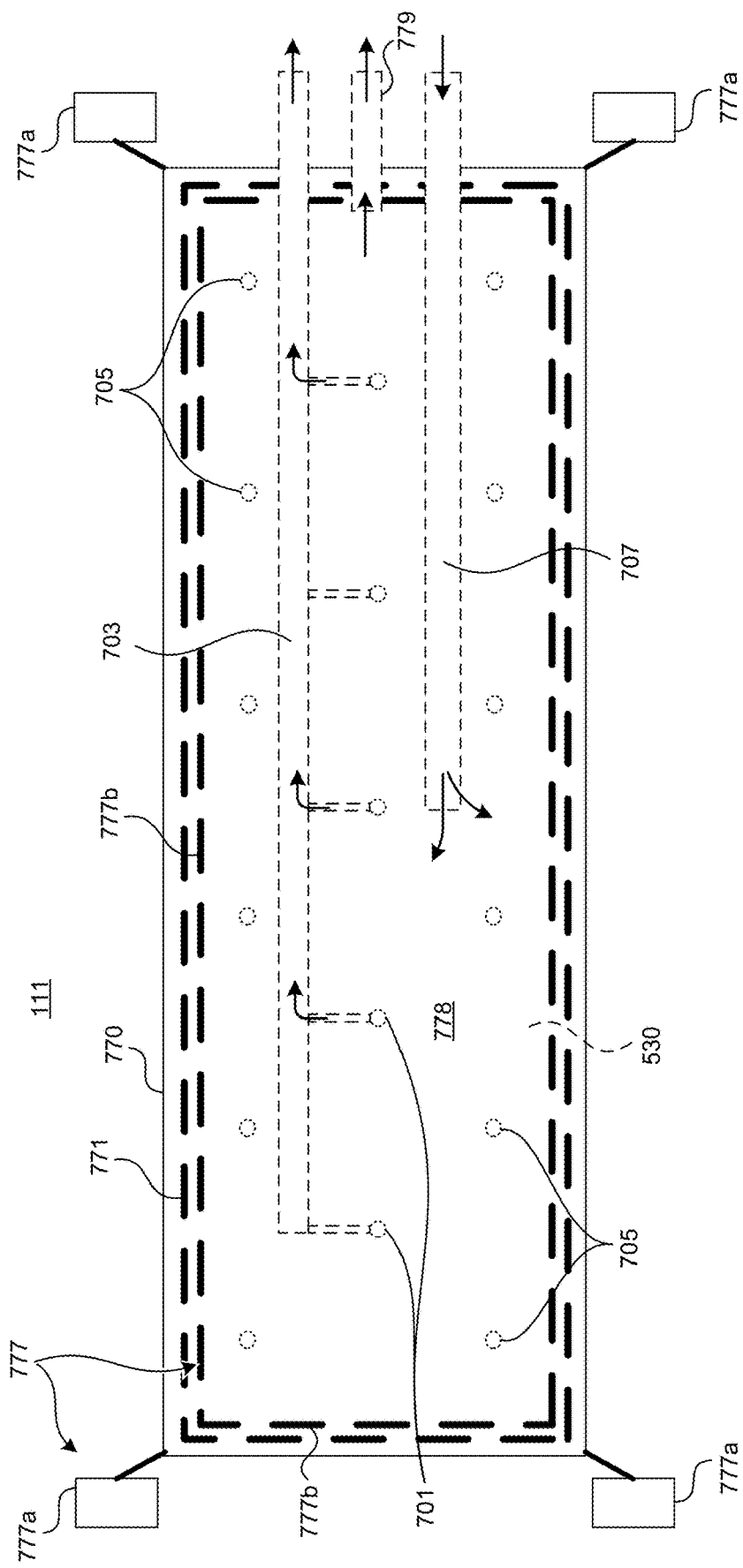
FIGS. 7A-7D illustrate arrangements for removing moisture from a roof in accordance with still further embodiments of the present technology.

FIG. 7A also illustrates a representative injection manifold 707 and extraction manifold 703. The injection manifold 707 provides air to a plenum 778 underneath the cover 770. Air is drawn from the plenum 778 into the roof structure via injection inserts 705. Moist air exits the roof structure via extraction inserts 701, which are connected to a corresponding extraction manifold 703. Excess air within the plenum 778 exits the plenum 778 via one or more escape openings 779.

The cover(s) 770 can be held in place with one or more retainers 771 and one or more weights 777. In an embodiment shown in FIG. 7A, the weights 777 can include one or more first weights 777a positioned outside at least one cover 770, and one or more second weights 777b positioned beneath at least one cover 770. The first weights 777a can be adhesively (and releasably) attached to the roof 111 and secured to the cover 770 with one or more lines. Further details of the second weights 777b and the retainers 771 are described below with reference to FIGS. 7B-7D.

Figure 7B:
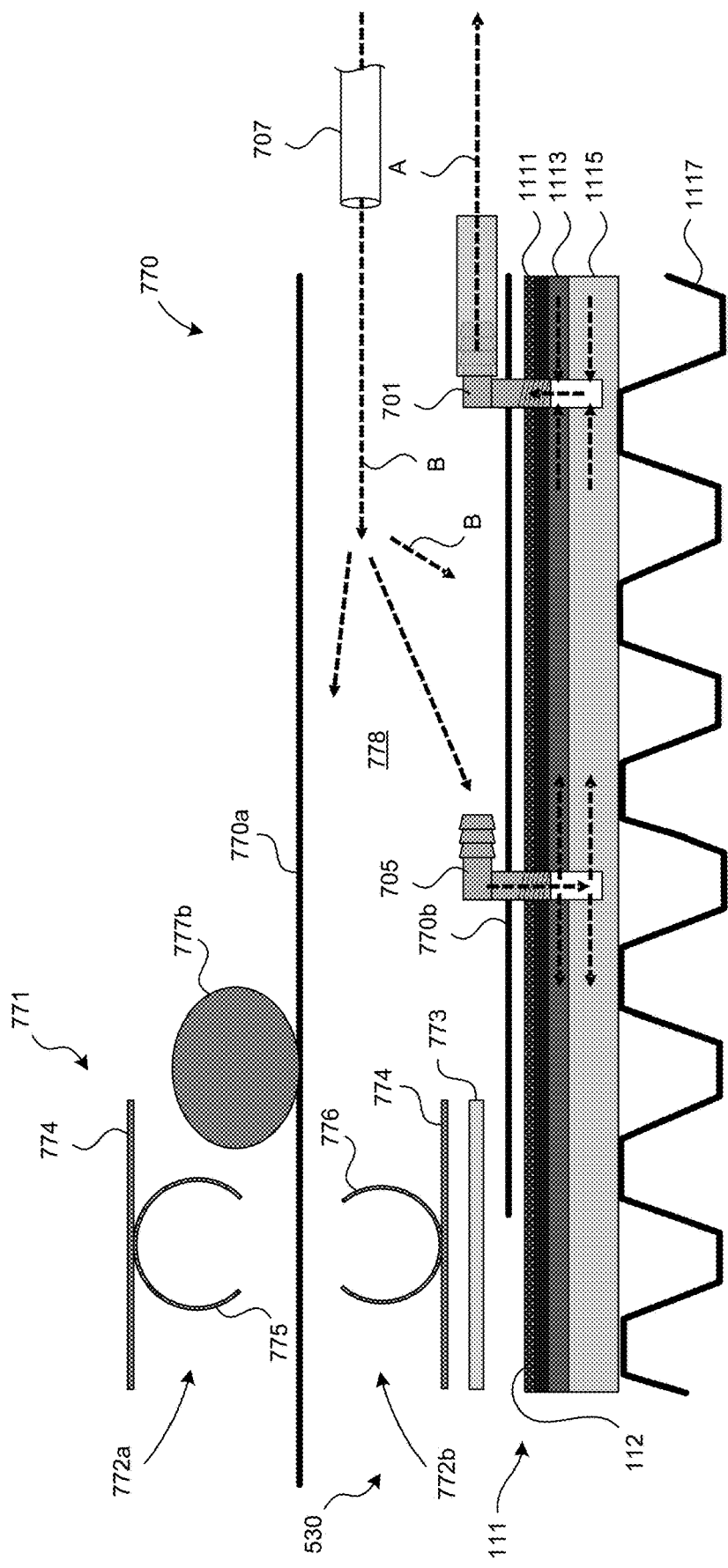

FIG. 7B illustrates in cross-section an arrangement in which the covers 770 include a first or upper cover 770a, and a second or lower cover 770b. The lower cover 770b can be positioned directly against the surface of the roof 111, for example, against an upwardly facing surface 112 of the membrane layer 1111. The space between the first cover 770a and the second cover 770b can define the boundaries of the plenum 778 into which the injection manifold 707 injects air (e.g., air that has been pre-treated via the dryer 540, the water separator 509, and/or the blower 513 described above), as indicated by arrows B. The injection manifold 707 can provide air at a slightly higher pressure than ambient (e.g., 2-4 inches of mercury above ambient pressure). This air is then drawn into the roof structure via the injection inserts 705. Air is withdrawn from the structure of the roof 111 via extraction inserts 701, and is directed to the extraction manifold 703, as indicated by arrow A. The force of the vacuum on the extraction manifold 703 (rather than the elevated pressure in the plenum 778) provides the primary force for withdrawing air from the treatment area 530. Accordingly, the structure of the roof 111 is less likely to delaminate than if the primary force on the flow resulted from high pressure in the plenum 778. At the same time, the force of the vacuum can be controlled (e.g., to 40"-100" Hg) so as to (a) prevent collapsing the layered structure of the roof 111 (e.g., reducing the thickness and therefore the insulative efficiency of the insulative layer 1115), while still (b) consolidating the layered structure as part of the drying process, which can increase structural integrity.

FIG. 7B also illustrates a cover retainer 771 that is used to secure the covers 770 in position. In a particular embodiment, the cover retainer 771 includes one or more clamp members 772, illustrated in cross-section as a first clamp member 772a and a second clamp member 772b. An adhesive 773 (e.g., an adhesive layer) secures the second cover 770b to the roof 111, and secures the second clamp member 772b to the second cover 770b. The adhesive 773 can be a liquid, tape, and/or other adhesive type and can also be used to secure the first weights 777a (FIG. 7A) to the roof 111. In a representative embodiment, the adhesive is generally similar to the adhesive used to secure vacuum bags around large commodity items, such as boats. The second clamp member 772b can include a strip or base 774, and a male element 776. In a particular embodiment shown in FIG. 7B, the male element 776 can include an upwardly facing open cylindrical element, for example, a section of pipe from which an arcuate, lengthwise-extending section has been removed. The corresponding first clamp member 772a can include a corresponding downwardly facing open cylindrical element 775 carried by a corresponding strip 774. The male element 776 is inserted into the female element 775 with the first cover 770a in between, as will be shown in FIG. 7C, to secure the first cover 770a to the second cover 770b. A second weight 777b (e.g., a water-filled fire hose) can aid in securing the covers 770 to the roof 111.

FIG. 7B further illustrates the injection and extraction inserts 705, 701 positioned in the roof structure. In a particular embodiment, individual inserts can be threaded into the roof structure. In a further aspect of this embodiment, the holes in the membrane 1111 that receive the inserts can be smaller than the outer diameter of the inserts so as to form a tight (sealed) interface.

Figure 7C:
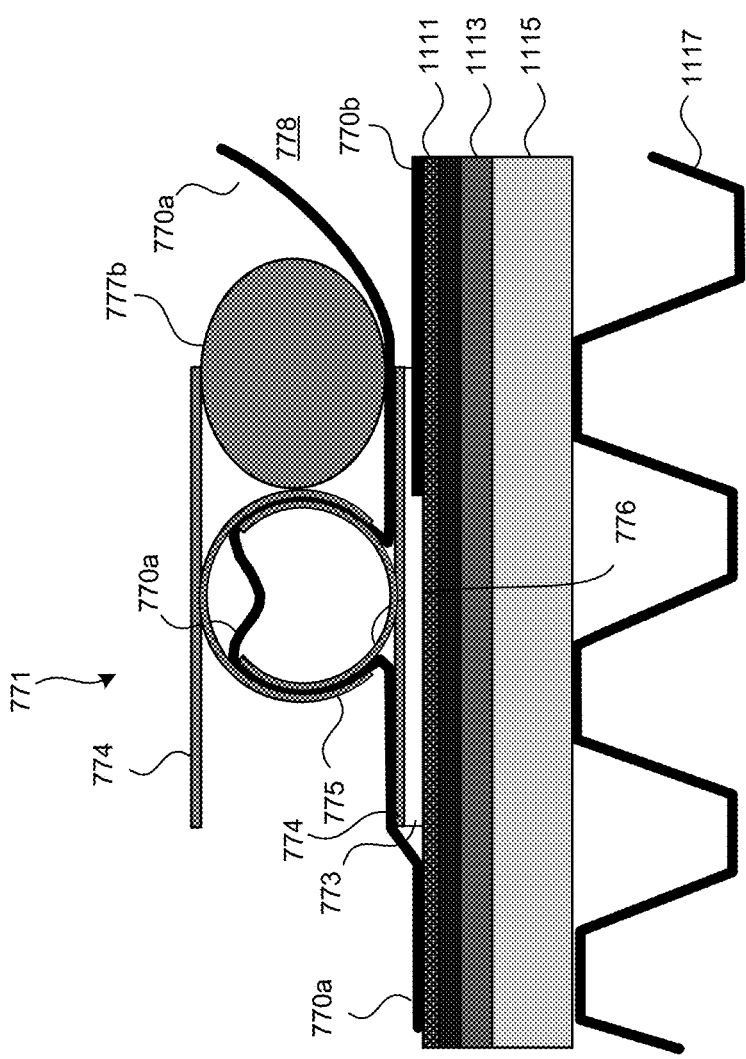

FIG. 7C illustrates a portion of the configuration shown in FIG. 7B, with the cover retainer 771 engaged with the covers 770a, 770b. The adhesive 773 secures the second (lower) cover 770b to the roof 111, and secures the second clamp member 772b to the second cover 770b. The first cover 770a is captured at the interface between the male element 776 and the female element 775. The second weight 777b provides further stability and resistance to wind loads. As low pressure air is introduced between the first and second covers 770a, 770b via the injection manifold 707 (FIG. 7B), the plenum 778 inflates slightly, allowing relatively dry air to be drawn into the roof structure through the injection inserts 705 (FIG. 7B), while moist air is drawn out through the extraction inserts 701 (FIG. 7B). The foregoing arrangement is deliberately constructed not to be airtight. In a particular embodiment, approximately 90% of the air provided to the plenum 778 "leaks" from the plenum 778 (e.g., via the escape opening(s) 779 described above with reference to FIG. 7A), with about 10% being directed into the roof structure. In other embodiments, the fraction of air directed from the plenum 778 into the roof structure can have other suitable values.

The cover retainer 771 can be formed from multiple segments (e.g., 2 feet in length) that are positioned end-to-end within the outer perimeter of the first cover 770a. The resulting connection between the first and second covers 770a, 770b need not be continuous or airtight because, as discussed above, a significant amount of the air within the plenum 778 is deliberately allowed to escape.

Figure 7D:
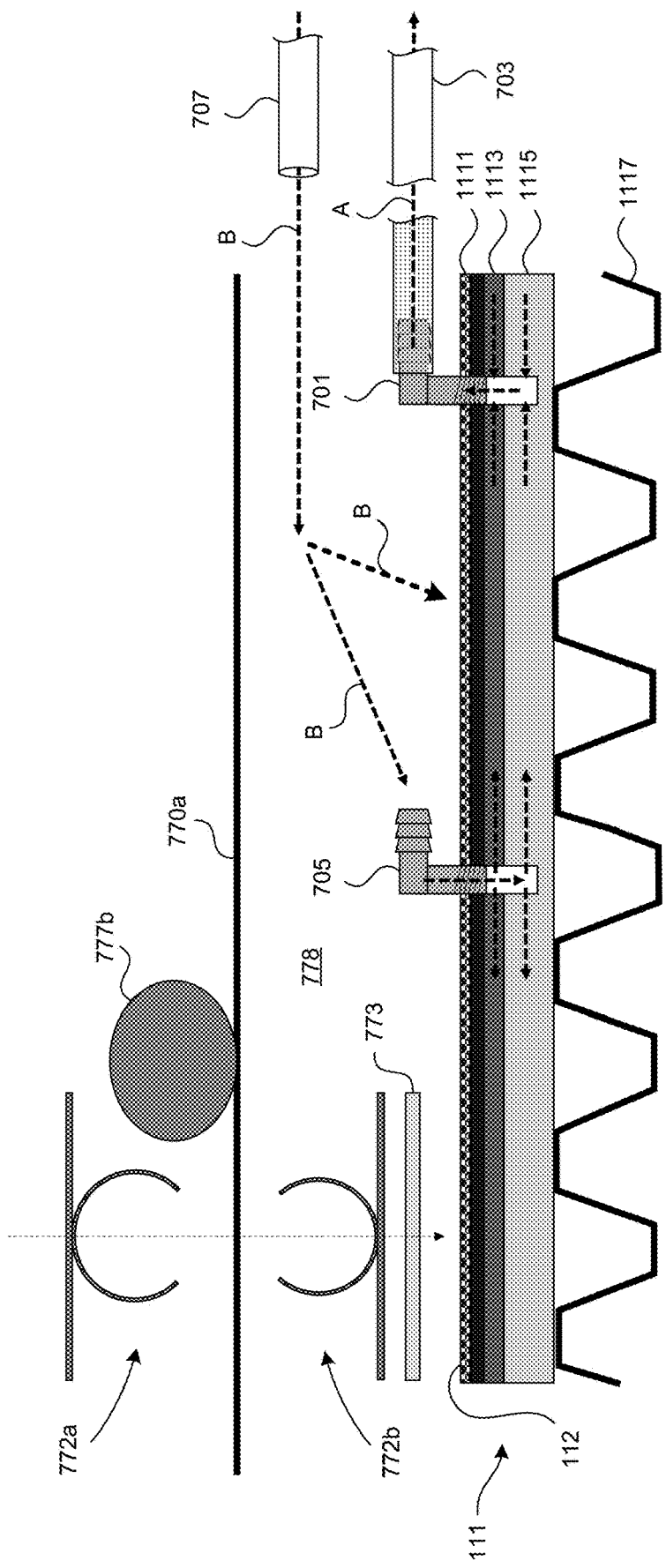

FIG. 7D illustrates an arrangement in which the second cover 770b has been eliminated. Instead, the first cover 770a is attached directly to the roof 111 using the adhesive 773, the first clamp member 772a, and the second clamp member 772b described above. This arrangement can be particularly suitable when the roof upper surface 112 is relatively smooth, allowing the first cover 770a to be secured directly to the roof without the aid of the second cover described above.

Figure 8A:
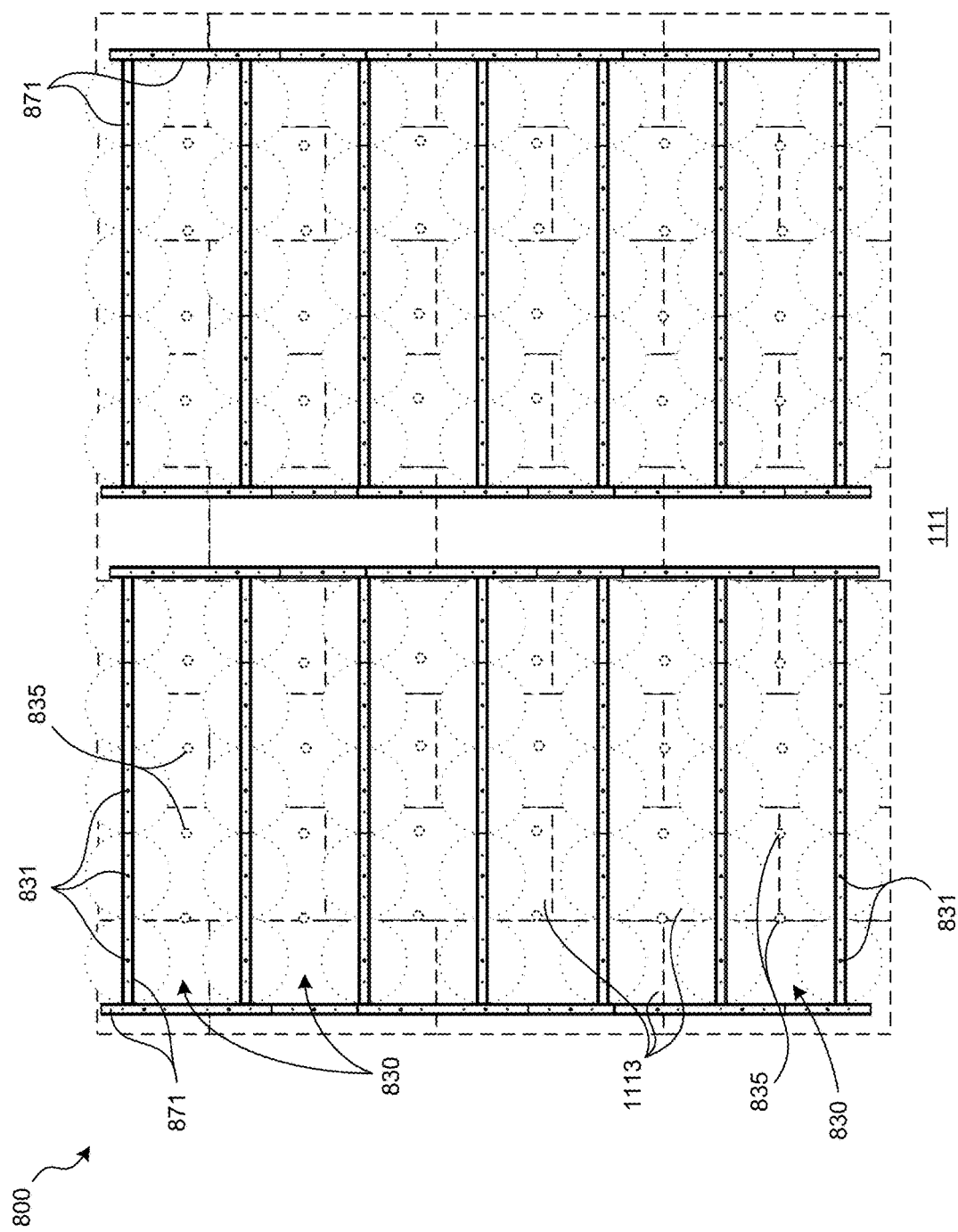
FIG. 8A is a partially schematic, plan view of a system for drying a roof in accordance with another embodiment of the present technology.

FIG. 8A is a partially schematic, plan view of a portion of a system 800 positioned on a roof 111 in accordance with another embodiment of the present technology. The roof 111 includes multiple fiberboard panels 1113 below the roof's surface (and shown in dashed lines in FIG. 8A). Typically, the fiberboard panels 1113 have a regular dimension, for example, 4 feet by 8 feet. The system 800 can be installed on the roof 111 to ensure that at least one injection site and at least one extraction site is positioned in each panel 1113. For example, the system 800 can include a series of interconnected cover retainers that secure a cover (shown in FIG. 8B) in position, and define corresponding treatment areas 830. Each treatment area 830 includes multiple injection locations 835 and extraction locations 831. In a particular aspect of this embodiment, the extraction locations 831 are positioned directly beneath the retainer 871, with the retainer 871 carrying the corresponding extraction inserts, as will be discussed in greater detail below with reference to FIG. 8B.

Figure 8B:
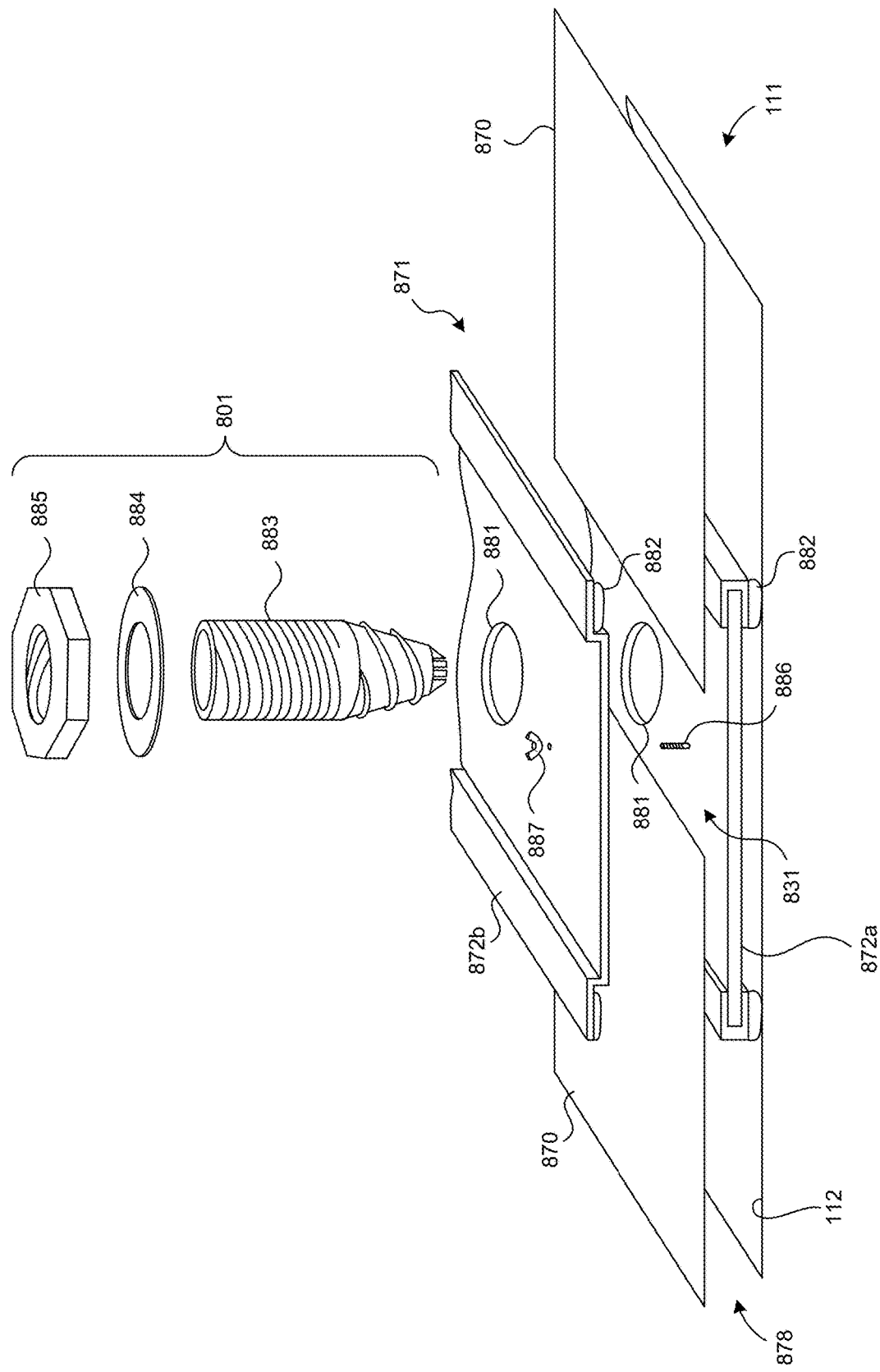
FIG. 8B is a partially schematic, cross-sectional illustration of a portion of the system shown in FIG. 8A.

FIG. 8B is a partially schematic, isometric illustration of a portion of the roof 111, including an upwardly facing roof surface 112. FIG. 8B also illustrates a portion of the cover retainer 871. The cover retainer 871 can perform multiple functions, including supporting extraction inserts relative to the roof surface 112, and supporting covers over the roof surface 112. For example, the cover retainer 871 can include a first element 872a (e.g., a first clamp member) and a second element 872b (e.g., a second clamp member) that together clamp one or more covers or sections of covers 870 therebetween. In a particular embodiment, the elements 872a, 872b are formed from stainless steel or another suitable, weather-resistant material (e.g., metal) that has sufficient weight to keep the covers 870 on the roof surface 112. The first element 872a can include a first fastener 886 (e.g., a threaded post) that extends through a hole in the second element 872b to receive a second fastener 887 (e.g., a wing nut). This arrangement is used to firmly clamp the covers 870 between the first and second elements 872a, 872b. Gaskets 882 extending downwardly from the first and second elements 872a, 872b aid in sealing the cover 870 to the retainer 871, and in sealing the retainer 871 to the roof 811. Once installed, the covers 870 define corresponding plenums 878 between the covers and the roof surface 112.

The cover retainer 871 can also support a corresponding extraction insert 801 in position at an extraction location 831 on the roof 111. In particular, each of the retainer elements 872a, 872b can include corresponding insert apertures 881, which are positioned coaxially during use. The extraction insert 801 can include a body 883 that is inserted through the insert apertures 881 and into a corresponding hole (not visible in FIG. 8B) in the roof surface 112. The extraction insert 801 is held in place with a washer 884 and a nut 885 (or other suitable fasteners). The extraction insert can further aid in securing the cover retainer 871 and the covers 870 to the roof 111. Further details of the extraction insert 801 and techniques for coupling it are described below with reference to FIGS. 9A-9C.

Figure 9B:
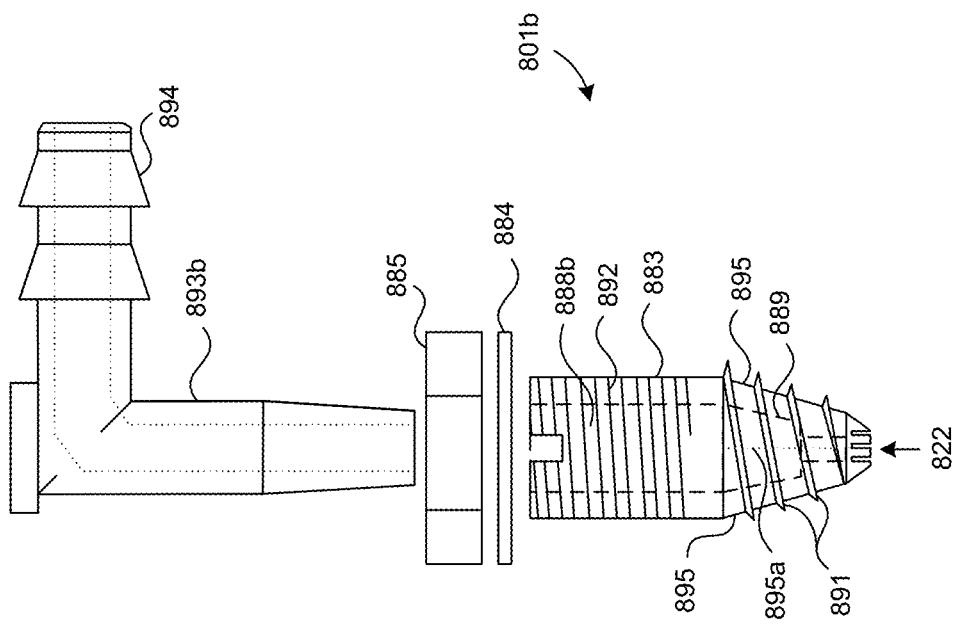
FIG. 9B is a partially schematic, side view of an insert configured in accordance with another embodiment of the present technology.
Figure 9A:
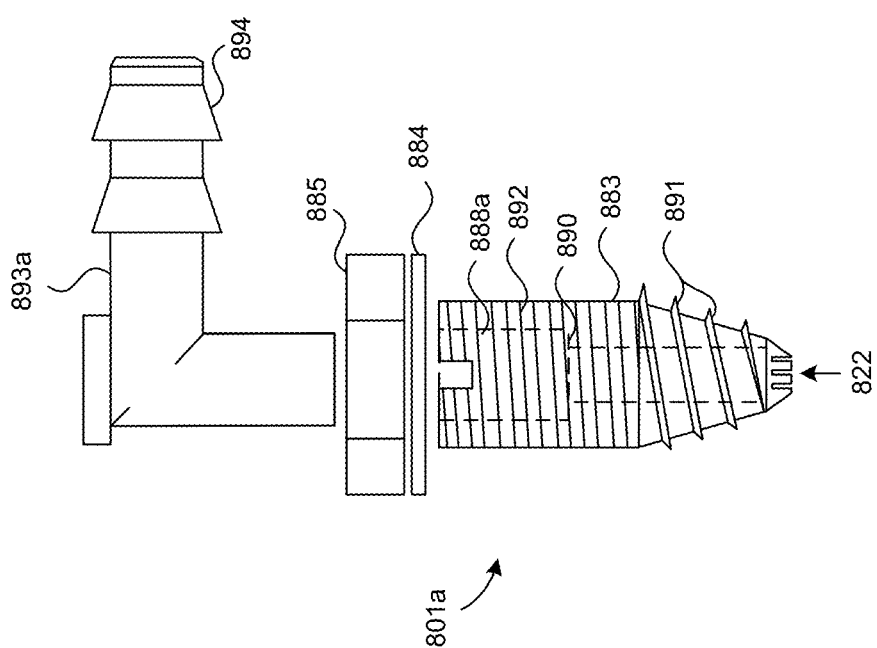
FIG. 9A is a partially schematic side view of an insert configured in accordance with an embodiment of the present technology.
Figure 9C:
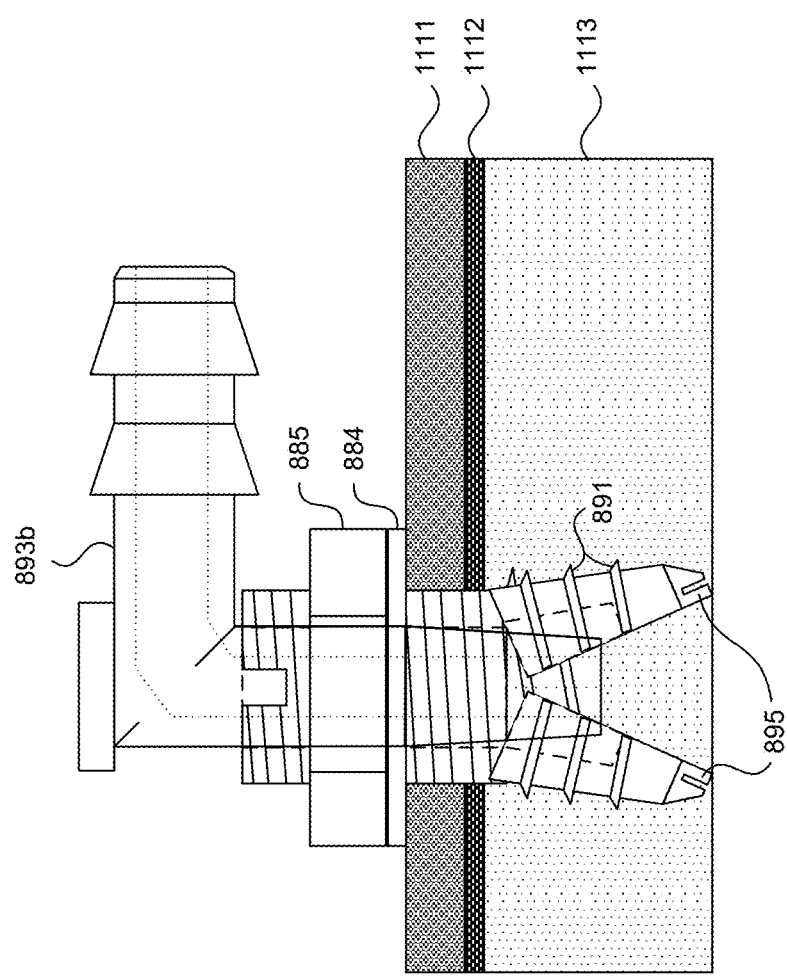
FIG. 9C illustrates the insert of FIG. 9B installed in a roof structure in accordance with an embodiment of the present technology.

FIGS. 9A-9C illustrate inserts in accordance with two embodiments of the present technology. The inserts were described above with reference to FIG. 8B as extraction inserts, but the same inserts can operate as injection inserts as well.

Referring first to FIG. 9A, a first extraction insert 801a includes a body 883 having fastener threads 892 that receive the corresponding nut 885. The body 883 can also include roof threads 891, which can be coarser threads configured to threadably engage the fibrous material of the fiberboard panels 1113 (FIG. 8A). The body 883 can also include a first internal cavity 888a having a shoulder 890 and extending downwardly to openings 882 that provide for fluid communication with the interior of the roof structure. A corresponding coupling 893a is inserted into the internal cavity 888a to rest on the shoulder 890 and provide a smooth passageway for fluid to enter or exit the insert 801a. The coupling 893a can include a hose fitting 894 for connections to an extraction manifold or injection manifold.

FIG. 9B illustrates a second extraction insert 801b that includes many of the same elements described above with reference to the first extraction insert 801a, but further includes multiple spreadable portions 895 (bordered by a separation line 895a) toward the lower end of the body 883. An internal cavity 888b includes a taper 889 so as to receive a corresponding tapered portion of a corresponding coupling 893b. The tapered portion of the coupling 893b is not tapered as narrowly as that of the internal cavity 888b. Accordingly, when the coupling 893b is inserted into the internal cavity 888b (as shown in FIG. 9C) the coupling 893b forces the spreadable portions 895 apart and into snug contact with the adjacent fiberboard 1113. Accordingly, the second extraction insert 801b can be used where the fiberboard 1113 is less dense, and/or otherwise compromised so that the spreadable portions 895 prevent the second extraction insert 801b from being pulled upwardly out of the fiberboard 1113. To remove the inserts shown in FIGS. 9A-9C, the corresponding coupling is pulled out, and the insert is unthreaded from the roof. During operation, the corresponding coupling is held in place by friction, the force applied by the nut 885, and/or the vacuum force used to extract moisture.

Figure 10:
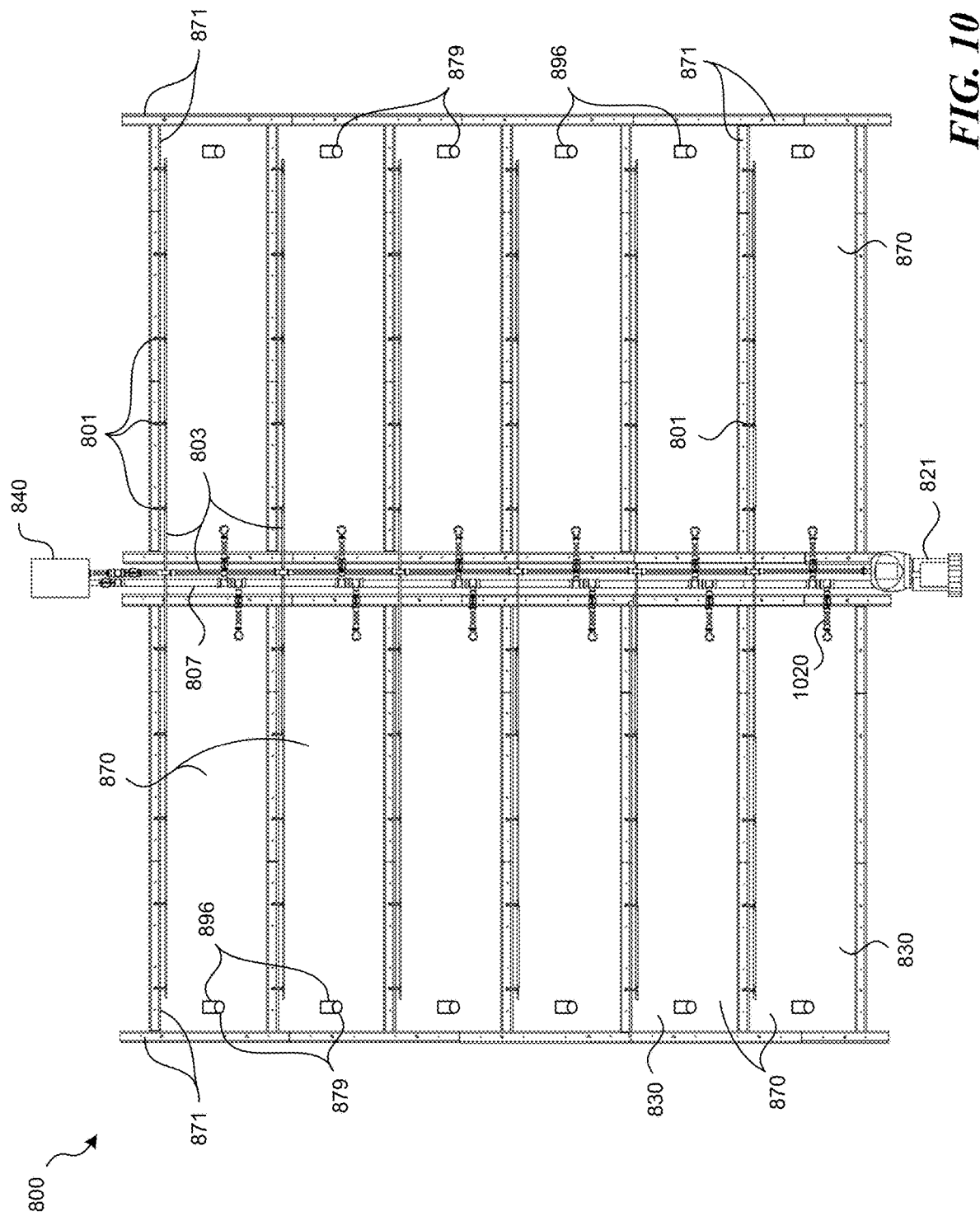
FIG. 10 is a partially schematic, plan view of the system shown in FIG. 8A, with a cover installed in accordance with an embodiment of the present technology.

FIG. 10 is a partially schematic, plan view of a representative system 800 in which covers 870 have been positioned over corresponding treatment areas 830 and held in place with cover retainers 871. The system 800 includes an injection manifold 807 that is coupled to the region beneath the covers 870 with corresponding supply connectors 1020. An extraction manifold 803 is coupled to the corresponding extraction inserts 801 positioned in the cover retainer 871. An air mover 821 (e.g., a blower) generates a vacuum in the extraction manifold 803 to withdraw moist air through the extraction inserts. The air can be directed to a moisture removal device 840 (e.g., a dehumidifier) which, when operating in a closed or partially closed loop fashion, directs the dried air back into the injection manifold 807. Each of the covers 870 can include one or more escape openings or vents 879 that allow a significant portion of the air directed into the corresponding plenums to escape. Each escape opening 879 can include a vent fitting 896 described in further detail later with reference to FIG. 15.

Figure 11:
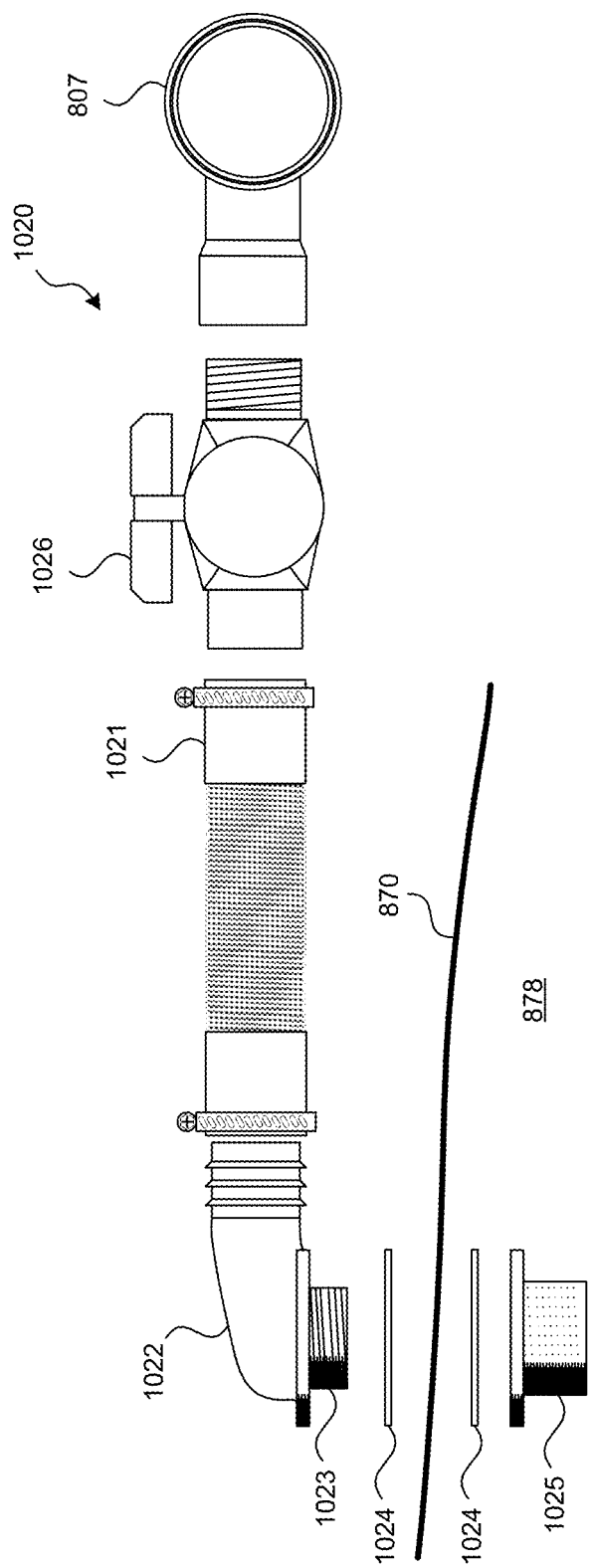
FIG. 11 is a partially schematic, partially exploded side view of a supply connector for connecting a supply of air to the cover shown in FIG. 10.

FIG. 11 is a partially schematic, side elevation view of a representative supply connector 1020 for delivering air into the plenum 878, as described above with reference to FIG.

10. The supply connector 1020 can be connected between the injection manifold 807 and the cover 870, which is in turn positioned over the plenum 878. The supply connector 1020 can include a conduit 1021 coupled to an elbow 1022 having a first fastener element 1023. A corresponding second fastener element 1025 can be threadably attached to the first fastener element 1023, with the cover 870 and one or more gaskets 1024 positioned between to provide a fluid-tight seal with the cover 870. In a particular embodiment, the supply connector 1020 can include a valve 1026 for regulating the amount of air directed into the plenum 878. In particular embodiments, the valves 1026 for each corresponding supply connector 1020 can be used to account for friction losses along the injection manifold 807. In particular, supply connectors 1020 close to the source of air for the plenum 878 can be partially closed to prevent excess air from being delivered to the corresponding treatment areas 830, and supply connectors 1020 located more distant from the source can have corresponding valves 1026 opened further to allow additional airflow.

Figure 12:
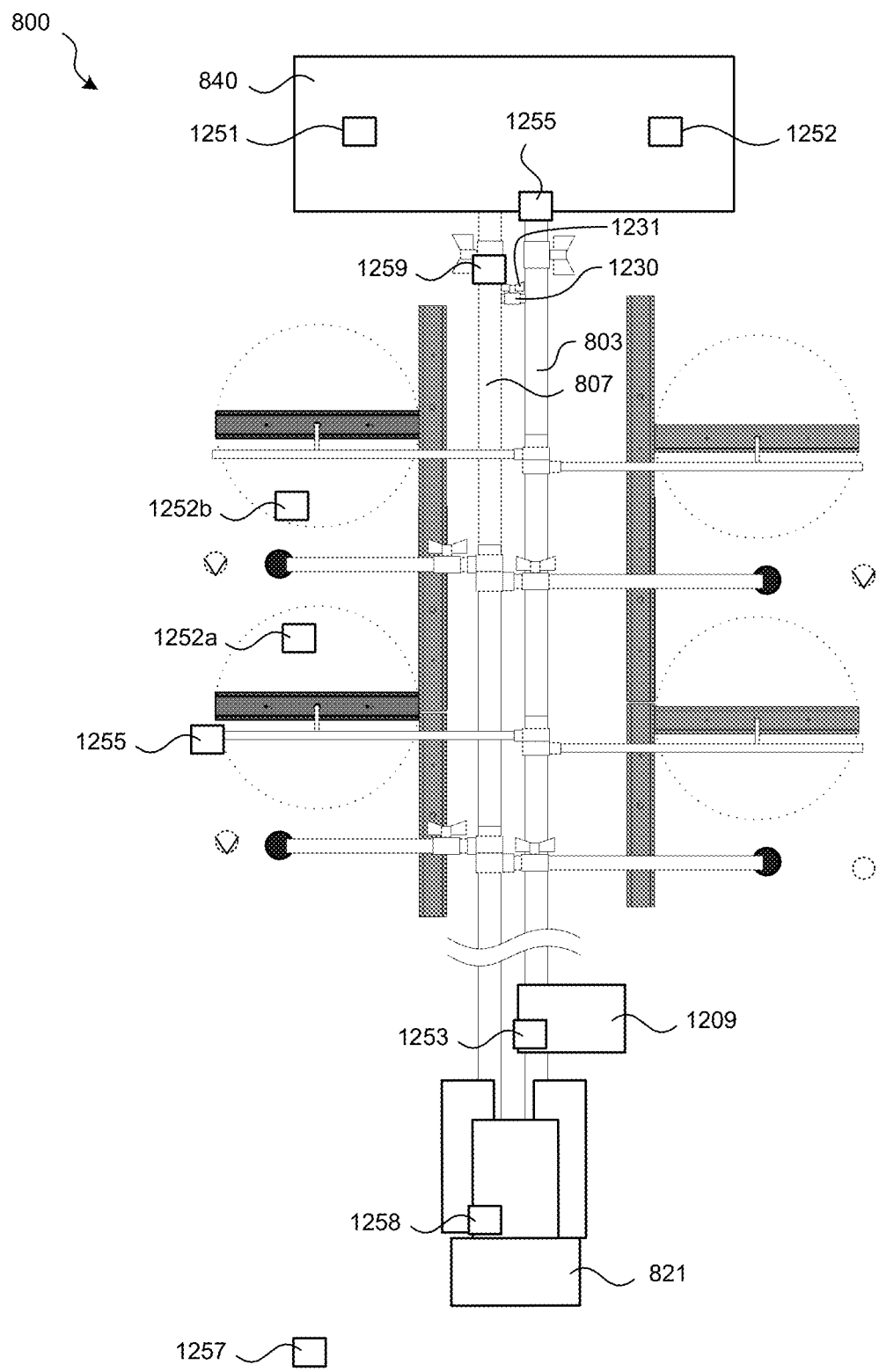
FIG. 12 is a partially schematic, plan view of a portion of the system shown in FIG. 10, illustrating representative sensors positioned in accordance with embodiments of the present technology.

FIG. 12 is a partially schematic, enlarged plan view illustration of a portion of a representative system 800 having features generally similar to those discussed above with reference to FIG. 10. Accordingly, the system 800 includes an extraction manifold 803, injection manifold 807, air mover 821, and moisture removal device 840. The system 800 can also include a water separator 1209 to remove moisture from the extracted fluid stream before it reaches the moisture removal device 840. A bypass channel 1230 is connected between the injection manifold 807 and the extraction manifold 803, and can include a bypass valve 1231. Accordingly, an operator (or an automated controller) can regulate the amount of flow that bypasses the moisture removal device 840. In particular embodiments, depending upon the environmental conditions and the mode in which the system is operated, the injection manifold 807 and/or the extraction manifold 803 can also be physically decoupled from the moisture removal device 840.

FIG. 12 also illustrates a variety of sensors distributed at various points throughout the system to measure one or more operational parameters. A dryer inlet sensor 1251 can measure the temperature, humidity, and/or operational status of the moisture removal device 840. A dryer outlet sensor 1252 can measure the same parameters at the outlet of the moisture removal device 840. Vacuum sensors 1255 can be positioned to measure the level of vacuum at various points within the system. Treatment area sensors 1252 (shown as a first treatment area sensor 1252*a* and a second treatment area sensor 1252*b*) can measure temperature, humidity, and/or pressure within broader areas of the system. For example, the first treatment area sensor 1252*a* can be positioned beneath the cover 870 (FIG. 10) but above the roof, and the second treatment area sensor 1252*b* can be positioned within the roof structure. A supply sensor 1259 can measure the temperature and/or moisture content of the air directed into the injection manifold 807. A water separator sensor 1253 can measure the power, water pump-out rate, vacuum level, and/or other parameters at the water separator 1209. An air mover sensor 1258 can measure similar quantities at the air mover 821. An environmental sensor 1257 can measure wind speed, incident solar energy, and/or other environmental parameters, and/or can record audio and/or video data.

Figure 13:
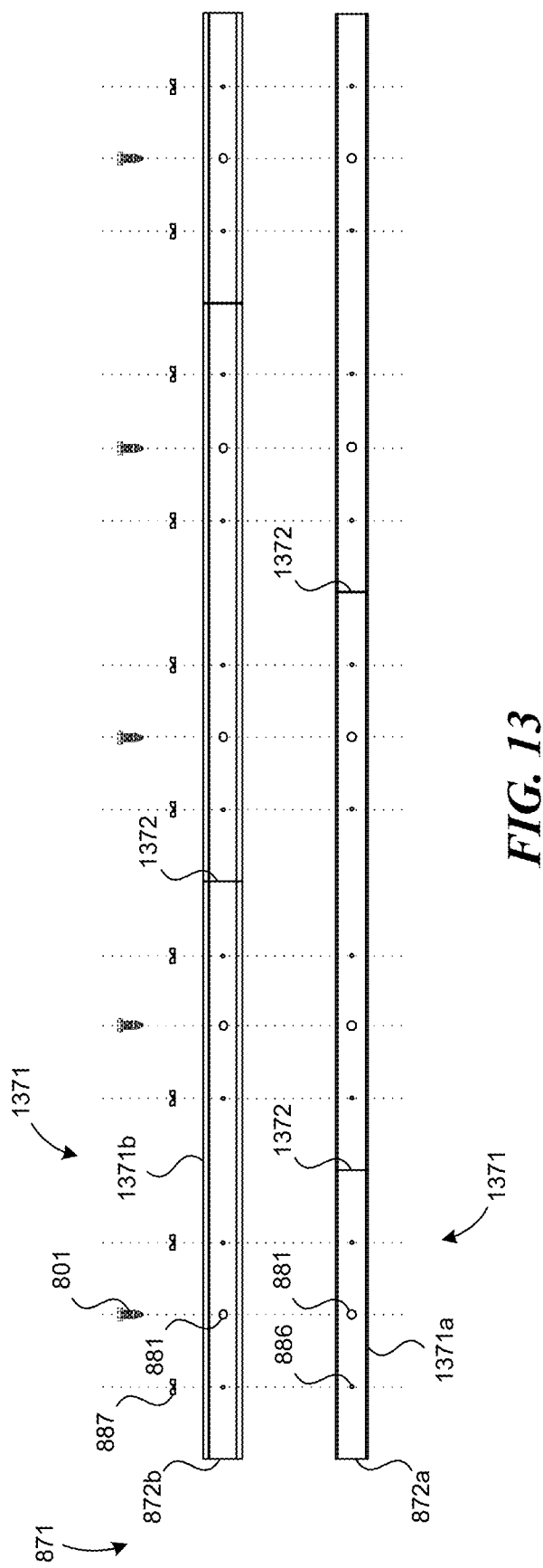
FIG. 13 is a partially schematic, exploded view of the elements of a retainer for a cover, configured in accordance with an embodiment of the present technology.

FIG. 13 is a partially schematic plan view illustration of an embodiment of the cover retainer 871, including the first element 872*a* which (for purposes of illustration) is laterally offset from the second element 872*b*. Each element can include multiple sections 1371 having section edges 1372 that abut the adjacent section. The sections 1371 can include short sections 1371*a* and long sections 1371*b*. The short and long sections 1371*a*, 1371*b* can be arranged as shown in FIG. 13 so that the section edges 1372 of the first element 872*a* do not align with or overlap the section edges 1372 of the second element 872*b*. This arrangement can provide a more secure and more fluid-type connection with the cover 870 (shown in FIG. 10).

Figure 14:
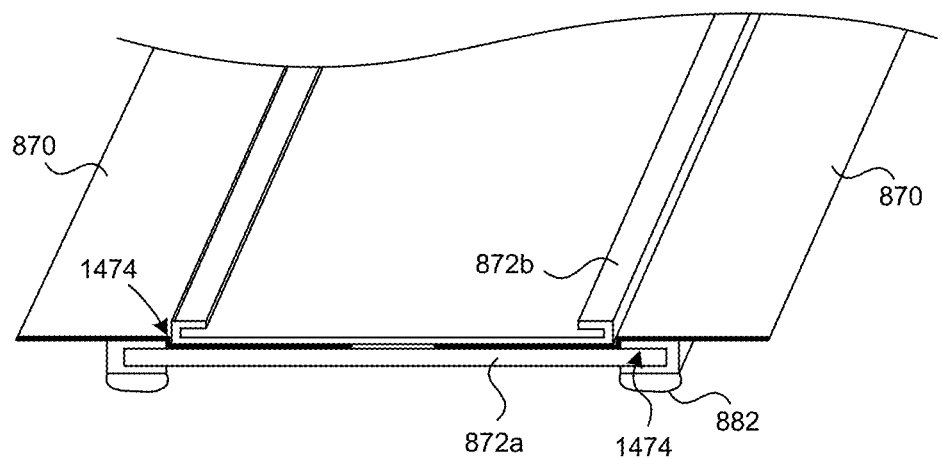
FIG. 14 is a partially schematic, cross sectional illustration of representative retainer elements configured in accordance with an embodiment of the present technology.

FIG. 14 is an enlarged isometric end view of the first and second elements 872*a*, 872*b* of the cover retainer 871 engaged with the covers 870. As shown in FIG. 14, the first element 872*a* can include steps 1474 that receive the second element 872*b* so as to further secure the covers 870 against lateral movement when the covers 870 are sandwiched between the first and second elements 872*a* and 872*b*.

Figure 15:
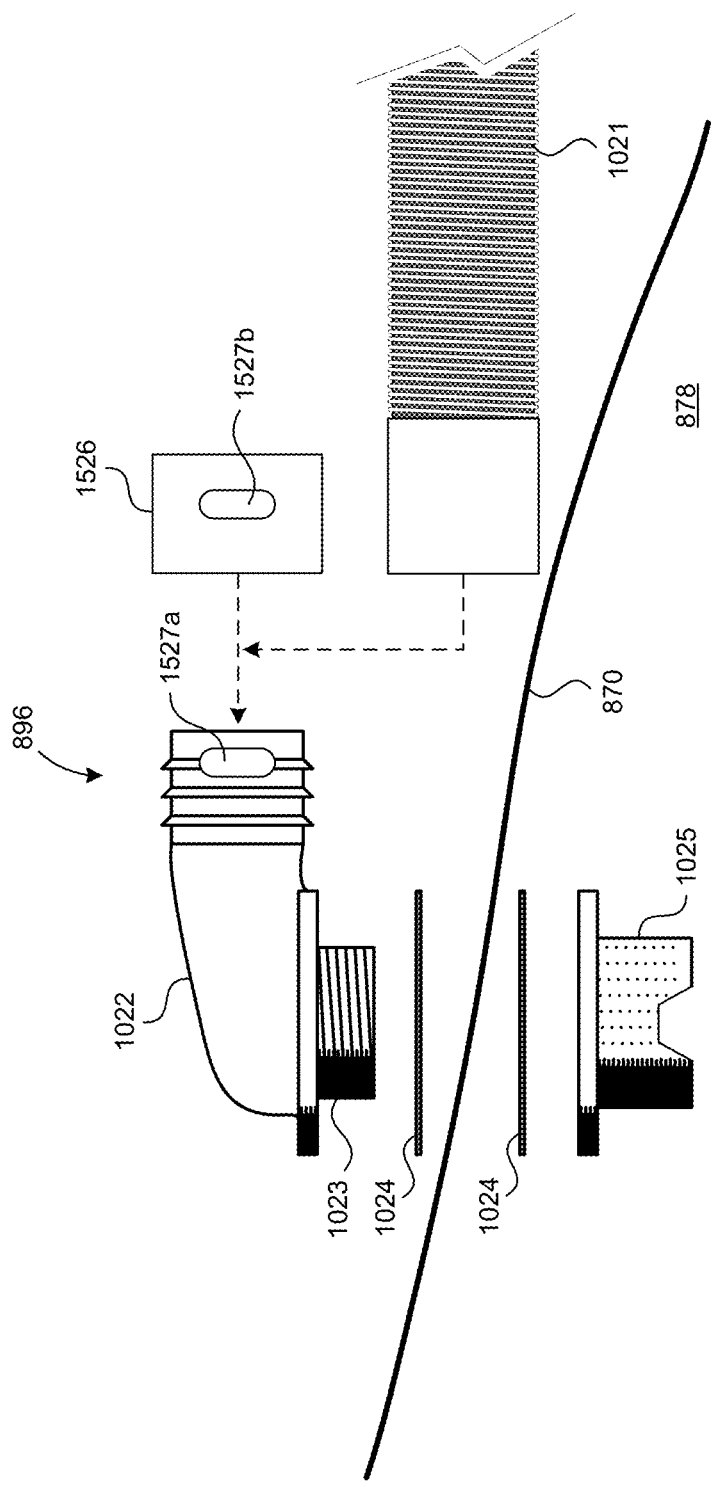
FIG. 15 is a partially schematic, side view of a vent fitting configured in accordance with an embodiment of the present technology.

FIG. 15 is a schematic illustration of a vent fitting 896, described above with reference to FIG. 10. The vent fitting 896 can include several elements similar to or identical to the supply connector 1020 described above with reference to FIG. 11, including an elbow 1022, first fastener element 1023, gaskets 1024, and second fastener element 1025. Instead of connecting to a conduit 1021 (as is the case with the typical supply connector 1020), the vent fitting 896 connects to a vent cap 1526. In addition, the elbow 1022 can include a first opening 1527*a*, and the vent cap 1526 can include a corresponding second opening 1527*b*. The vent cap 1526 is pressed over the end of the elbow 1022 and can be rotated clockwise or counterclockwise to (a) align the second opening 1527*b* with the first opening 1527*a* (to allow venting) or (b) offset the two openings (to prevent venting). Accordingly, the vent fitting 896 can be used to control the rate at which air vents from the plenum 878 formed underneath the cover 870.

One advantage of embodiments of the present technology is that the system can be customized to fit various types of structures that are water-damaged. Another advantage of embodiments of the present technology is that the system can include modular components that have multiple purposes, simple installation procedures, and/or relatively low replacement costs. For example, the dehumidifier and blower can be used for tasks other than roof drying. The inserts can be easily accessed from the outer surface of the roof, and can be relatively inexpensive to produce and install. Yet another feature of at least some of the foregoing methods and associated systems is that they can be easily adjusted in response to environmental conditions, e.g., by employing an open loop arrangement under cold/dry weather conditions, and a closed loop arrangement under hot/wet weather conditions and/or selecting between a recirculating arrangement and a single-pass arrangement.

An overarching result of any one or combination of the foregoing features is that the process of drying a roof can be more effective, less expensive, and/or more flexible than conventional processes. As a result, the process of drying a roof can be simpler and/or less expensive than present processes.

From the foregoing, it will be appreciated that specific embodiments of the technology have been described herein for purposes of illustration, but that various modifications may be made without deviating from the technology. For example, the extraction inserts and the extraction manifold can be integrally formed in a molding process. Similarly, the injection inserts and the injection manifold can also be integrally formed in a molding process. Without departing from the scope of the present technology, the inserts and manifolds can have configurations other than those described above. For example, the numbers of the extraction inserts and the injection inserts can be different. In still further embodiments, arrangements generally similar to those described above can be used to dry other building components, e.g., walls and/or floors. In several embodiments described above, the flow proceeding along the flow path away from the roof is referred to as an airflow. It will be understood that while air will typically be a significant constituent of the flow, the flow will typically include water vapor, liquid water and/or particulates, depending on the level of moisture in the roof, the position along the flow path, an/or other factors.

In particular embodiments described above, the manifolds are positioned over multiple inserts. In other embodiments, a manifold can be positioned over a single insert. In still further embodiments, both the insert and the manifold can be eliminated, and the flow can proceed directly from a conduit to a hole (at an injection location) and/or directly from a hole to a conduit (at an extraction location). The relative positions of the male and female elements described above with reference to FIG. 7B can be reversed in particular embodiments. In still further embodiments, the second weight 777b can be integrated with the male element. The covers can be made from materials other than those described above.

Certain aspects of the technology described in the context of particular embodiments may be combined or eliminated in other embodiments. For example, aspects of the technology can be practiced without the dehumidifier, as described above. In particular, single-pass systems can eliminate the dehumidifier, particularly if the ambient air is dry enough to be injected directly into the roof structure. Other single-pass systems can include a dehumidifier to dry the injected air, but do not include an open or closed loop recirculation feature. Further, while advantages associated with certain embodiments of the technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

To the extent any of the materials incorporated herein by reference conflict with the present disclosure, the present disclosure controls.

We claim:

1. A system for securing a cover to a roof structure, the system comprising:
  a first roof-cover clamp element positioned at a first side of the cover, the first roof-cover clamp element having a first insert aperture;
  a second roof-cover clamp element positioned at a second side of the cover, the second roof-cover clamp element having a second insert aperture; and
  an insert received by the first and second insert apertures, the insert having a body held in place with a washer and a nut;
  wherein the first roof-cover clamp element is positionable relative to the second roof-cover clamp element to deform and firmly capture at least a portion of the cover between the first and second roof-cover clamp elements, wherein the cover and the roof structure define a plenum, and wherein the second roof-cover clamp member is configured to be positioned in the plenum.

2. The system of claim 1, wherein the first and second insert apertures are coaxially positioned so as to enable the insert to pass through.

3. The system of claim 2, wherein the insert includes a body configured to extend into the roof structure.

4. The system of claim 1, wherein the cover is a first cover, and wherein the system further comprises a second cover positioned between the first roof-cover clamp element and the roof structure.

5. The system of claim 1, wherein the first and second roof-cover clamp elements are formed from a weather-resistant material.

6. The system of claim 5, wherein the weather-resistant material includes a metal.

7. The system of claim 5, wherein the weather-resistant material includes a stainless steel.

8. The system of claim 1, wherein the first roof-cover clamp element is sealingly attached to the roof structure by a gasket.

9. The system of claim 1, wherein the second roof-cover clamp element has a major surface and a side portion, and wherein the side portion is elevated from the major surface of the second roof-cover clamp element.

10. The system of claim 9, wherein the side portion defines a space positioned to accommodate a gasket to sealingly attach the second roof-cover clamp element to the cover.

11. The system of claim 1, wherein the first roof-cover clamp element has a first hole configured to be aligned with a second hole of the second roof-cover clamp element.

12. The system of claim 11, wherein the first hole and the second hole enable a fastener to pass through.

13. The system of claim 12, further comprising the fastener, wherein the fastener includes a threaded post.

14. The system of claim 1, wherein the second insert aperture is located at a center of the second roof-cover clamp element.

15. The system of claim 1, wherein the first insert aperture is located at a center of the first roof-cover clamp element.

16. The system of claim 1, wherein the first insert aperture is aligned with a center of the first roof-cover clamp element.

17. The system of claim 1, wherein the first roof-cover clamp element has a rectangular shape.

18. A method for securing a cover to a roof structure, comprising:
  sealingly positioning a first roof-cover clamp element of a retainer on the roof structure, the first roof-cover clamp element having a first insert aperture;
  positioning the cover on the first roof-cover clamp element;
  aligning a second insert aperture of a second roof-cover clamp element of the retainer with the first insert aperture; and
  sealingly positioning the second roof-cover clamp element on the cover and the first roof-cover clamp element to deform and firmly capture the cover so as to form a plenum between the cover and the roof structure,
  wherein an insert is received by the first and second insert apertures, and wherein the insert having a body held in place with a washer and a nut.

19. The method of claim 18, wherein the first roof-cover clamp element includes a step portion configured to receive the second roof-cover clamp element, and wherein the method further comprises positioning the second roof-cover clamp element to engage the step portion of the first roof-cover clamp element.

20. The method of claim 18, further comprising: securing the first and second roof-cover clamp elements by positioning a threaded post in a first hole of the first roof-cover clamp element and a second hole of the second roof-cover clamp element.

21. The system of claim 1, further comprising the cover.

22. A system for securing a cover to a roof structure, the system comprising:
- a first roof-cover clamp element positioned at a first side of the cover, the first roof-cover clamp element having a first insert aperture;
- a second roof-cover clamp element positioned at a second side of the cover, the second roof-cover clamp element having a second insert aperture, wherein the first roof-cover clamp element is positionable relative to the second roof-cover clamp element to capture at least a portion of the cover firmly between the first and second roof-cover clamp elements; and
- an insert received by the first and second insert apertures, the insert having a body held in place with a washer and a nut;
- wherein the cover is positionable over an individual treatment area of the roof structure;
- wherein the insert is in fluid communication with an air mover;
- wherein the insert is in fluid communication with a dehumidifier; and
- wherein the second roof-cover clamp element has a side portion positioned to engage the first roof-cover clamp element.

* * * * *

UNITED STATES PATENT AND TRADEMARK OFFICE
CERTIFICATE OF CORRECTION

PATENT NO. : 11,686,482 B2
APPLICATION NO. : 17/000578
DATED : June 27, 2023
INVENTOR(S) : Brandon Burton et al.

Page 1 of 1

It is certified that error appears in the above-identified patent and that said Letters Patent is hereby corrected as shown below:

In the Drawings

On sheet 5 of 23, in Figure 4, reference numeral 413, Line 2, delete "the an" and insert -- the --.

On sheet 5 of 23, in Figure 4, reference numeral 415, Line 2, delete "the an" and insert -- the --.

On sheet 5 of 23, in Figure 4, reference numeral 417, Line 2, delete "the an" and insert -- the --.

In the Specification

In Column 5, Line 22, delete "indentions," and insert -- indentations, --.

In Column 21, Line 11, delete "an/or" and insert -- and/or --.

Signed and Sealed this
Tenth Day of October, 2023

Katherine Kelly Vidal
*Director of the United States Patent and Trademark Office*